(12) United States Patent
Nonaka

(10) Patent No.: US 10,906,441 B2
(45) Date of Patent: Feb. 2, 2021

(54) ROTABLY LOCKABLE ARMREST

(71) Applicant: TS TECH CO., LTD., Asaka (JP)

(72) Inventor: Hidetsune Nonaka, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 66 days.

(21) Appl. No.: 16/088,264

(22) PCT Filed: Mar. 9, 2017

(86) PCT No.: PCT/JP2017/009480
§ 371 (c)(1),
(2) Date: Sep. 25, 2018

(87) PCT Pub. No.: WO2017/169629
PCT Pub. Date: Oct. 5, 2017

(65) Prior Publication Data
US 2019/0084458 A1 Mar. 21, 2019

(30) Foreign Application Priority Data

Mar. 31, 2016 (JP) .................................. 2016-071593
Mar. 31, 2016 (JP) .................................. 2016-071596

(51) Int. Cl.
B60N 2/75 (2018.01)

(52) U.S. Cl.
CPC ............. *B60N 2/767* (2018.02); *B60N 2/753* (2018.02)

(58) Field of Classification Search
CPC ........ A47C 7/541; A47C 7/543; B60N 2/753; B60N 2/767

(Continued)

(56) References Cited

U.S. PATENT DOCUMENTS

| 6,050,645 A * | 4/2000 | Bradbury | B60N 2/767 |
| | | | 297/411.38 |
| 7,140,688 B2 * | 11/2006 | Hann | B60N 2/753 |
| | | | 297/411.32 |

(Continued)

FOREIGN PATENT DOCUMENTS

| JP | 2000000141 A | * | 1/2000 | ............. B60N 2/753 |
| JP | 2002199965 A | * | 7/2002 | |

(Continued)

OTHER PUBLICATIONS

Office Action issued for Japanese Patent Application No. 2016-071596, Dispatch Date: Mar. 19, 2019, 7 pages including English translation.

(Continued)

*Primary Examiner* — Milton Nelson, Jr.
(74) *Attorney, Agent, or Firm* — Hamre, Schumann, Mueller & Larson, P.C.

(57) ABSTRACT

An armrest is fixed to a shaft (20) of a one-way clutch (1) that is provided on a seat frame, and is rotatable together with the shaft (20) relative to the seat frame. The armrest is configured to be switchable by the one-way clutch (1) between a locked state in which rotation of the armrest in a downward direction is restricted and an unlocked state in which rotation of the armrest in upward and downward directions is allowed. The armrest includes a main frame (100) constituting a framework of the armrest, and a reinforcement frame (200) having a thickness larger than that of the main frame (100), the reinforcement frame (200) and the main frame (100) lying one over another. The reinforcement frame (200) is fixed to the shaft (20).

19 Claims, 18 Drawing Sheets

(58) Field of Classification Search
USPC .......................................... 297/411.2, 411.32
See application file for complete search history.

(56) References Cited

U.S. PATENT DOCUMENTS

| | | |
|---|---|---|
| 9,676,307 B2 | 6/2017 | Yamane et al. |
| 2014/0159461 A1* | 6/2014 | Mochizuki ............. B60N 2/767 |
| | | 297/411.32 |
| 2016/0022046 A1 | 1/2016 | Yamane et al. |

FOREIGN PATENT DOCUMENTS

| | | | |
|---|---|---|---|
| JP | 2003299548 A | * | 10/2003 |
| JP | 2005118311 | | 5/2005 |
| JP | 2005334301 A | | 12/2005 |
| JP | 2006055327 A | * | 3/2006 |
| JP | 2006061426 A | | 3/2006 |
| JP | 2009072328 | | 4/2009 |
| JP | 2016030032 A | | 3/2016 |
| WO | 2014024709 A1 | | 7/2016 |

OTHER PUBLICATIONS

International Search Report issued for International Patent Application No. PCT/JP2017/009480, dated Jun. 6, 2017, 5 pages including English translation.
Office Action issued for Chinese Patent Application No. 201780021195.X, dated Jul. 9, 2020, 11 pages including English translation.

* cited by examiner

FIG.2
(a) STOWING OPERATION
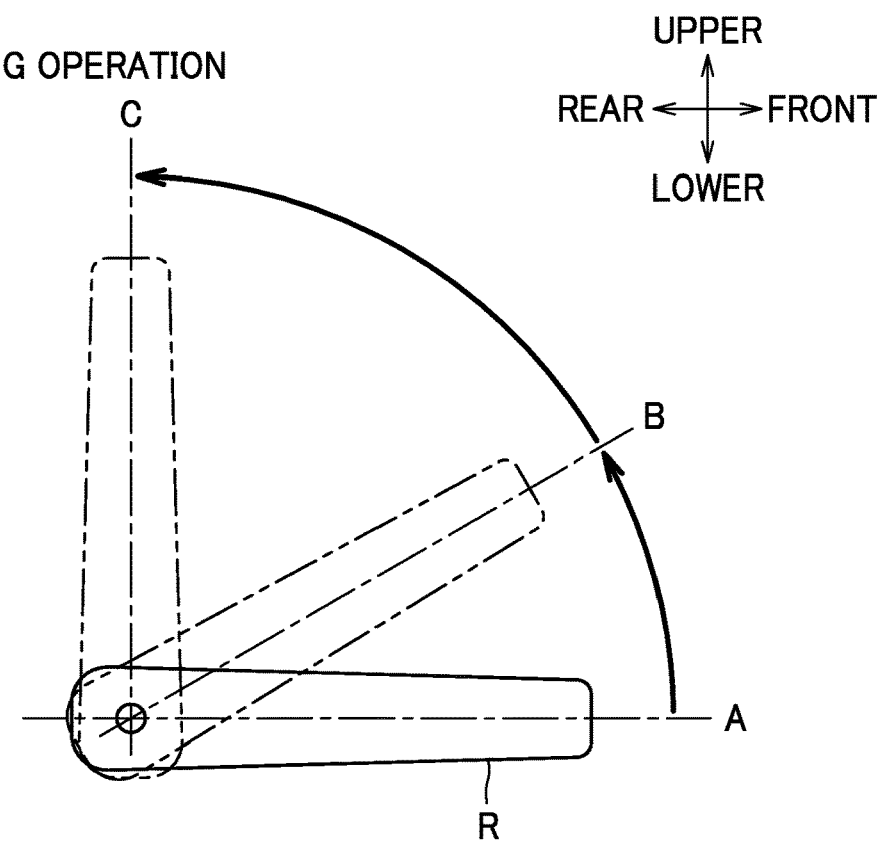
(b) FOLDING OUT OPERATION
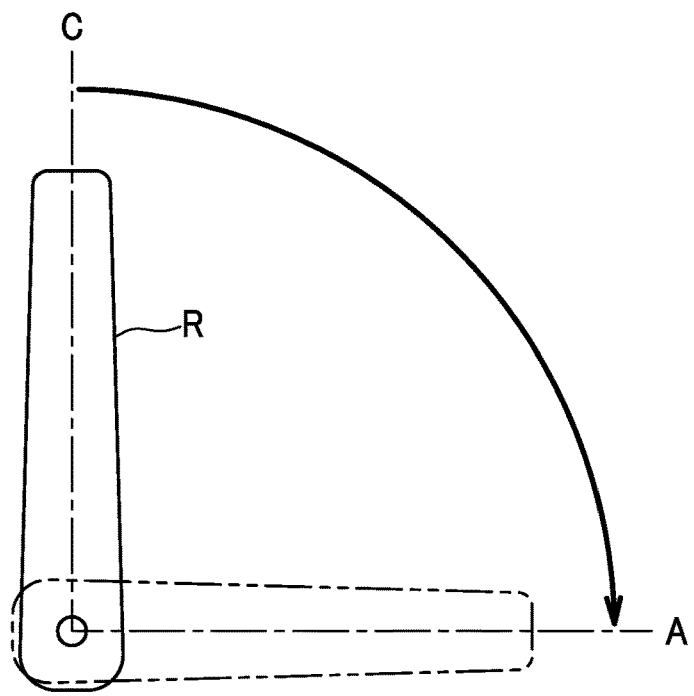

FIG.11
(a)
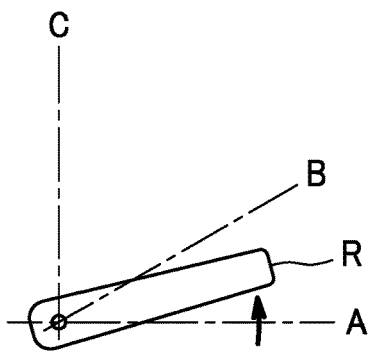
(b)
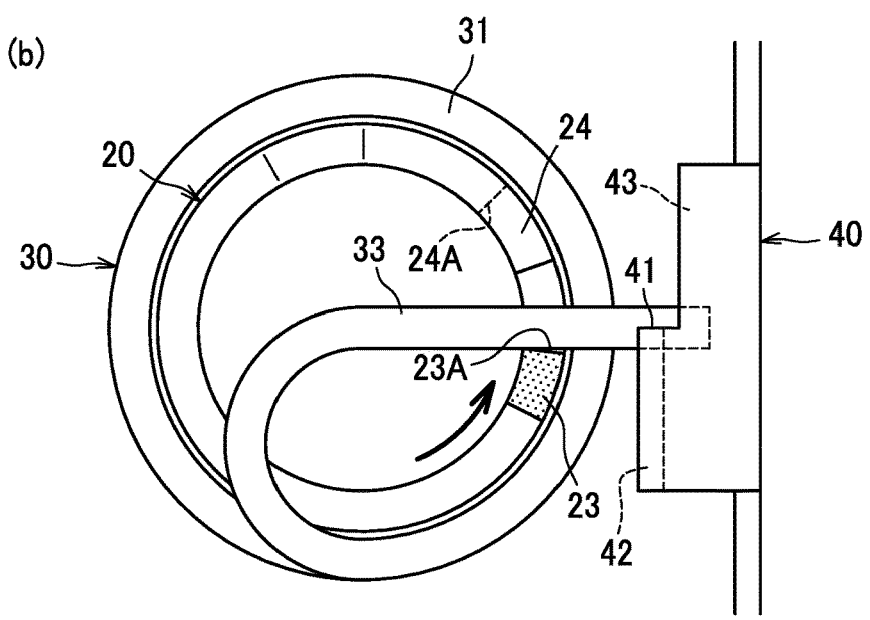
(c)
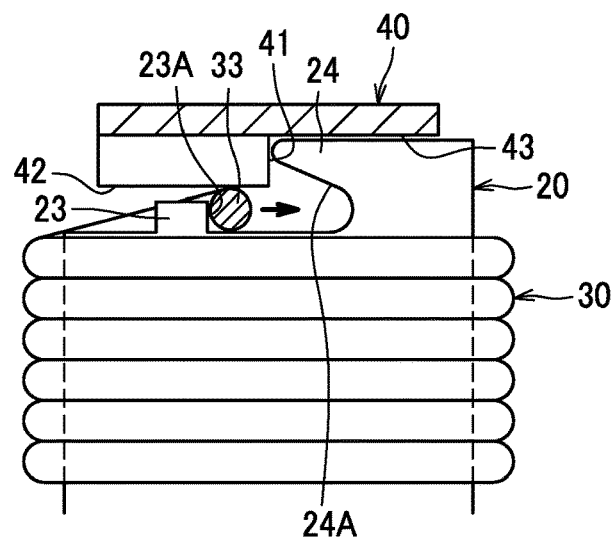

FIG.12
(a)
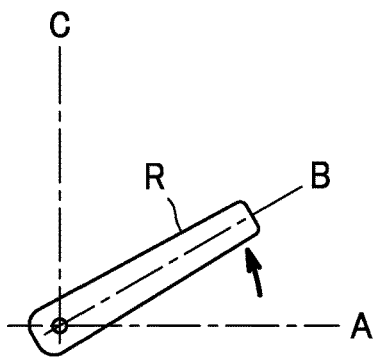
(b)
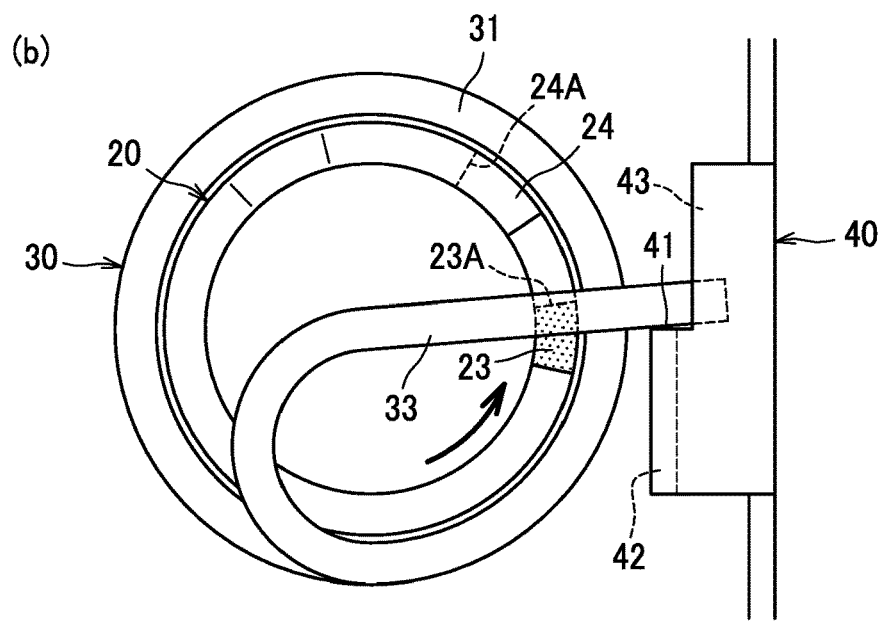
(c)
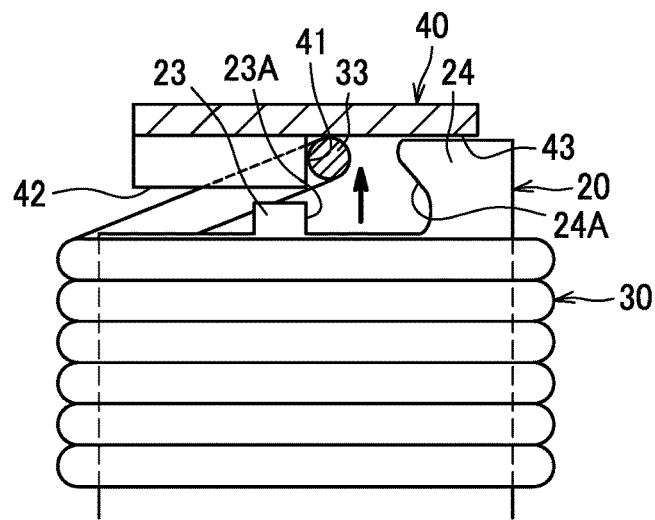

FIG.13
(a)
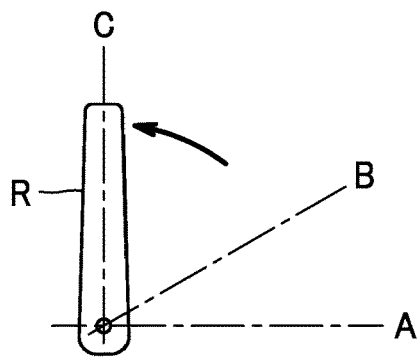
(b)
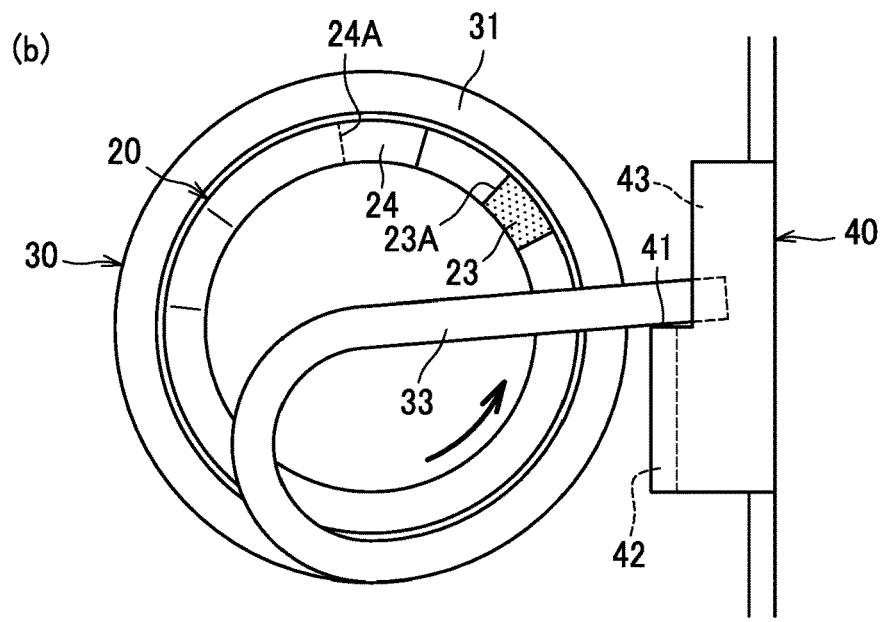
(c)
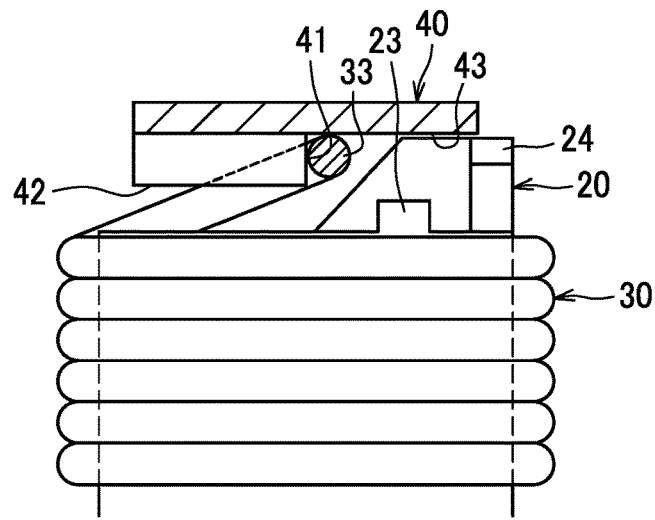

FIG.14
(a)
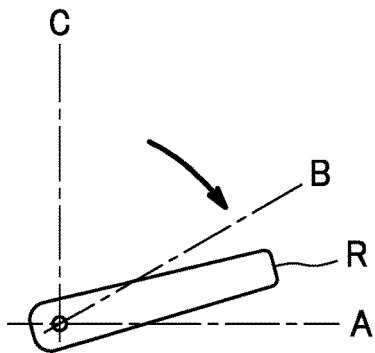
(b)
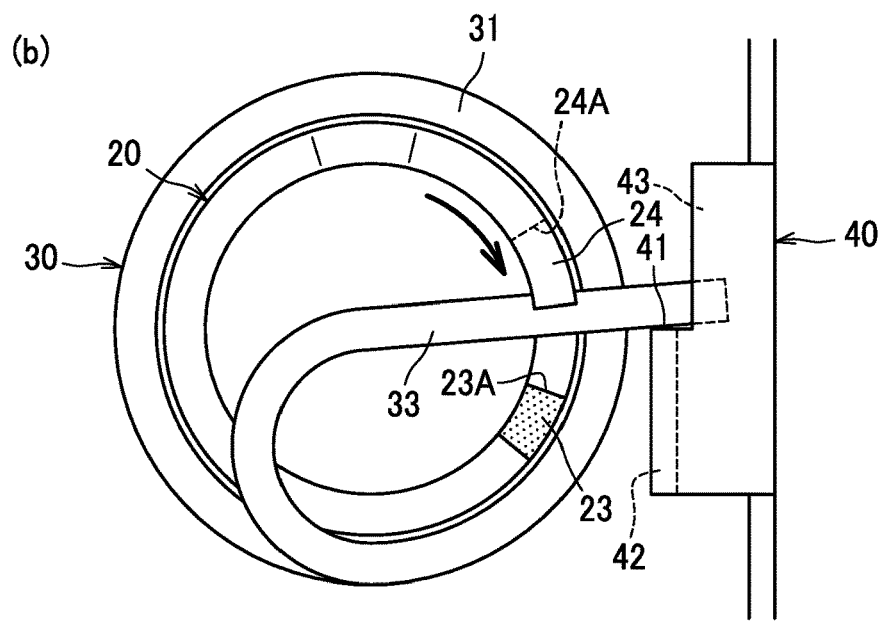
(c)
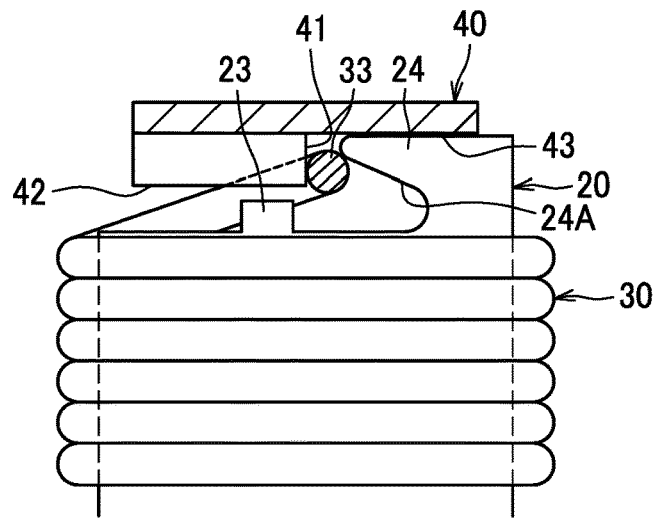

FIG.16
(a)
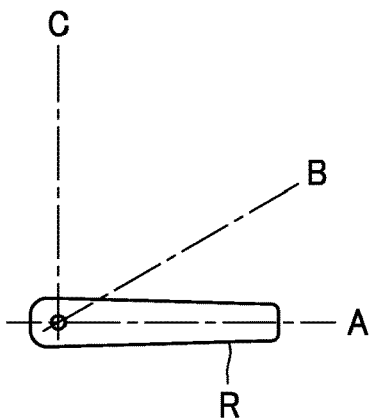
(b)
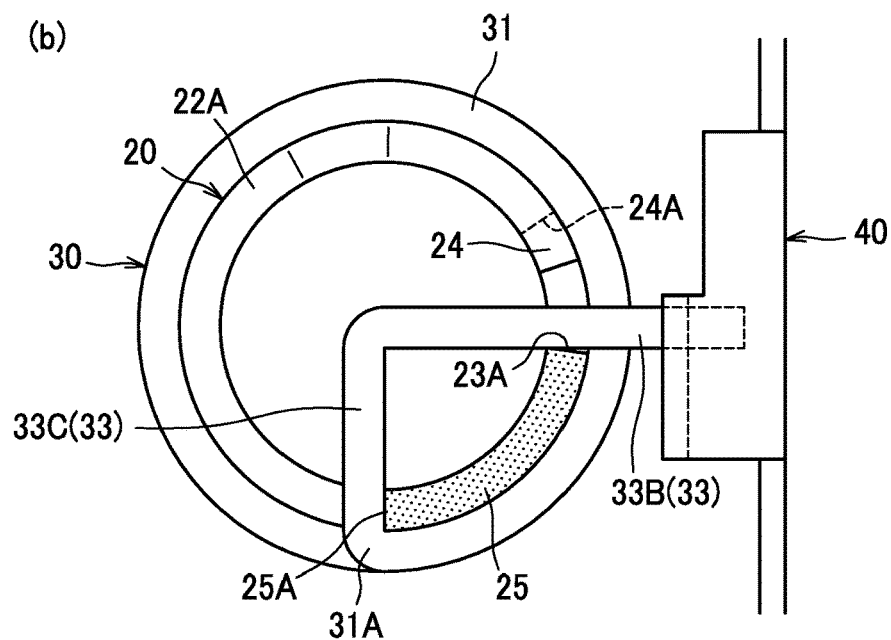
(c)
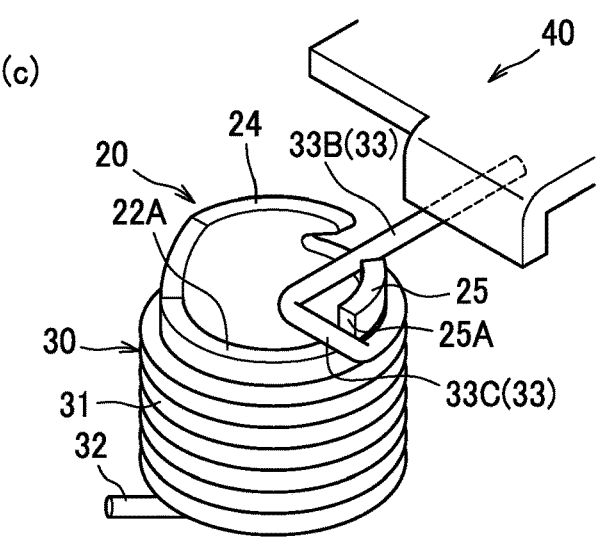

FIG.17
(a)
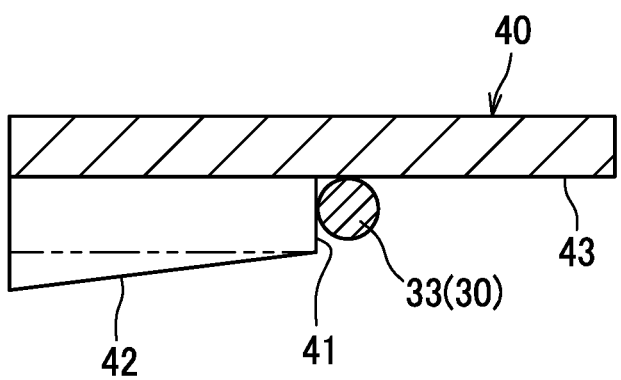
(b)
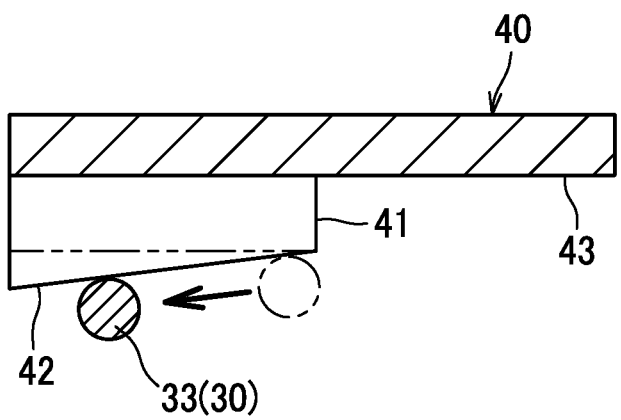

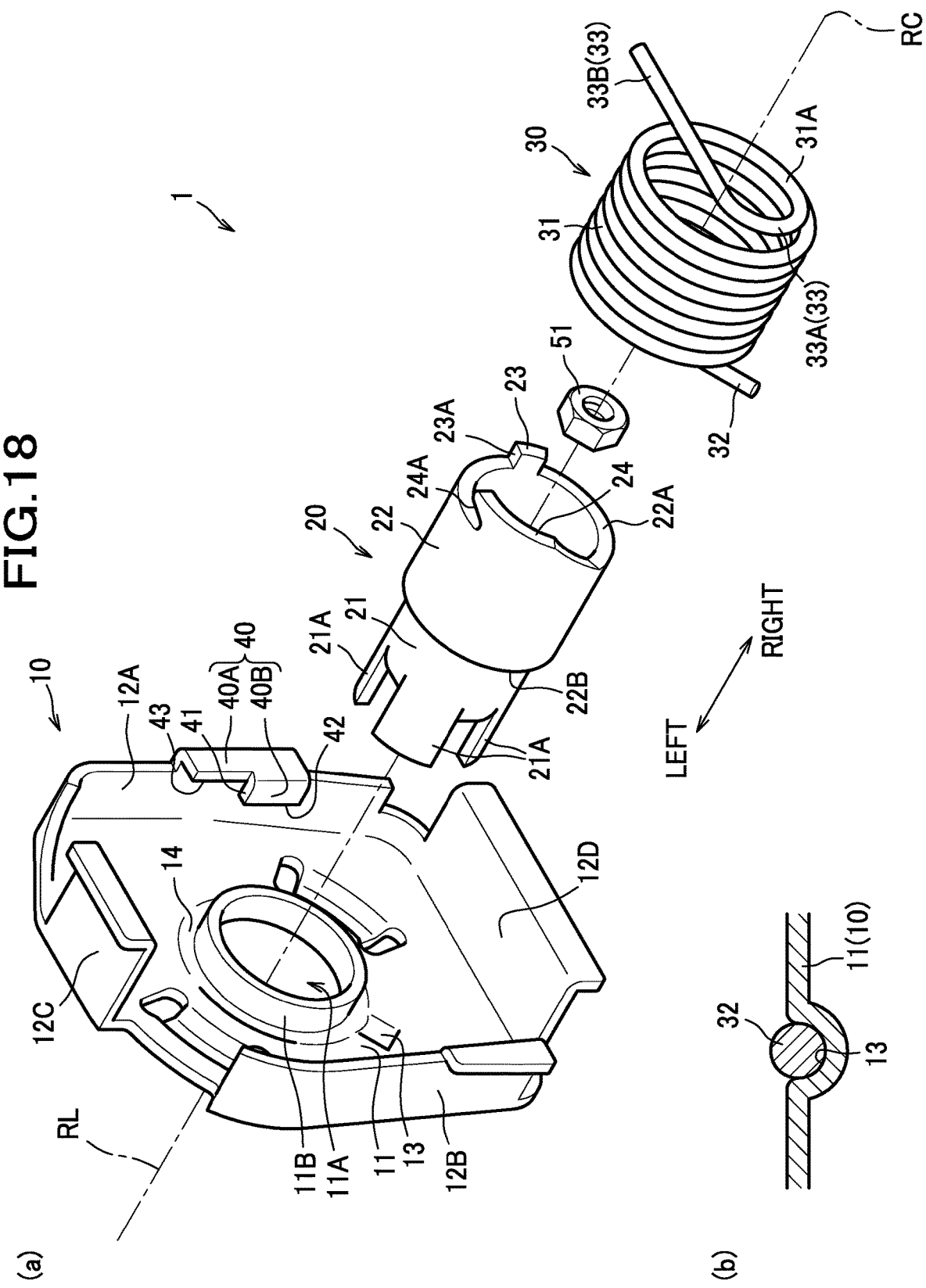

ROTATABLY LOCKABLE ARMREST

TECHNICAL FIELD

The present invention relates to an armrest rotatable relative to a seat frame.

BACKGROUND ART

Among various types of armrests, there is known an armrest provided on an automotive seat and configured to be switchable between a locked state in which rotation of the armrest in a downward direction is restricted when the armrest is used in a certain range of angles and an unlocked state in which rotation of the armrest is allowed in upward and downward directions when the armrest is not used and is in a range other than the certain range.

For example, the armrest disclosed in Patent Document 1 includes a coil-shaped lock spring wound around an outer peripheral surface of a lock drum as a mechanical unit (i.e., one-way clutch) for restricting rotation of the armrest in a downward direction. In this structure, when the armrest is in the locked state, rotation of the armrest in a direction in which the lock spring tightens is restricted as the lock spring winds up to tighten the lock drum, whereas rotation of the armrest in a direction in which the lock spring is loosened is allowed. On the other hand, the lock spring is kept more loosened when the armrest is in the unlocked state than when in the locked state, so that the rotation of the armrest in the upward and downward directions are allowed.

To be more specific, the one-way clutch disclosed in Patent Document 1 includes mounting hardware fixed to a seat frame, a lock drum fixed to the mounting hardware, a base plate rotatable relative to the lock drum, a lock spring wound around the outer peripheral surface of the lock drum and having one end fixed to the base plate and the other end as a free end, and a cover plate which is joined to the base plate and to which the armrest frame is fixed. In this structure, a spring guide of the cover plate continues to push the free end of the lock spring in a direction in which the lock spring is loosened, so that the unlocked state is kept. On the other hand, when the free end of the lock spring is pushed by a return cam of the lock drum and moves to release the holding of the lock spring by the spring guide, the lock spring tightens to enter the locked state.

CITATION LIST

Patent Literature

Patent Document 1: WO2014/024709 A1

SUMMARY OF THE INVENTION

It is desirable that the rotatable armrest be produced as light as possible to enable the armrest to be operated lightly. It is said that the conventional technique makes it possible to reduce the thickness of the mechanical unit and thus to reduce the weight of the whole unit as well as the weight of the armrest. However, provision of the mechanical unit on the armrest, while ensuring the rigidity of a portion of the armrest near the lock drum (shaft), makes it difficult to further reduce the weight of the armrest.

Other than the lock drum, the lock spring, and the cover plate provided with the spring guide, the conventional structure further includes the mounting hardware fixed to the seat frame, and the base plate coupled to the cover plate. Accordingly, the number of parts is disadvantageously increased.

In view of the above, the present invention seeks to provide an armrest which can reduce the weight thereof while ensuring the rigidity at a portion near the shaft.

It is also an object of the present invention to increase ease of assembly work of the armrest.

It is also an object of the present invention to improve the rigidity of the frame of the armrest.

It is also an object of the present invention to reduce the size of the armrest.

It is also an object of the present invention to improve a robust and stable feel which a user experiences when putting his/her arm on the armrest.

Further, the present invention seeks to provide a one-way clutch of the type using a tightening force of the lock spring that is fitted onto the outer peripheral surface of the shaft to restrict a rotation of a rotatable frame relative to the seat frame, wherein the number of parts can be reduced.

It is also an object of the present invention to reduce contact noise of the lock spring.

It is also an object of the present invention to reduce the size of the one-way clutch.

In order to achieve any of the above objects, an armrest according to the present invention is fixed to a shaft of a one-way clutch that is provided on a seat frame. The armrest is rotatable together with the shaft relative to the seat frame and switchable by the one-way clutch between a locked state in which rotation of the armrest in one direction is restricted and an unlocked state in which rotation of the armrest in two directions is allowed. The armrest comprises: a main frame constituting a framework of the armrest; and a reinforcement frame having a thickness larger than that of the main frame, the reinforcement frame and the main frame lying one over another, wherein the reinforcement frame is fixed to the shaft.

With this configuration, since the shaft is fixed to the reinforcement frame having a thickness larger than that of the main frame, the reinforcement frame ensures the rigidity of a portion of the armrest near the shaft. Further, the one-way clutch is provided on the seat frame, i.e., not on the armrest, and the main frame constituting a framework of the armrest can be made smaller in thickness and lighter in weight thanks to the reinforcement frame, so that the armrest can be reduced in weight as a whole.

In the above-described armrest, the reinforcement frame may have an engagement hole with which a protruding portion provided on an end portion of the shaft is engaged, and the main frame may have a through-hole through which the protruding portion extends.

With this configuration, since the protruding portion of the shaft with which the reinforcement frame is engaged is provided through the through-hole of the main frame, the protruding portion can determine the positions of the main frame and the reinforcement frame relative to each other. This can increase ease of assembly work of the armrest.

In the above-described armrest, the through-hole and the engagement hole may be provided at plural positions corresponding to a plurality of protruding portions provided on the end portion of the shaft, and be arranged on a circle whose center coincides with a rotation center of the armrest.

With this configuration, the positions of the main frame and the reinforcement frame can be determined easily and accurately, so that the ease of assembly work of the armrest can be further improved.

In the above-described armrest, the main frame may include a first base portion, a first side wall portion provided at one end of the first base portion in a width direction orthogonal to a longitudinal direction of the first base portion and extending from the one end of the first base portion in a direction away from the seat frame, and a first folded-back portion extending from an end of the first side wall portion and folded back such that an end of the first folded-back portion points to the first base portion, and the reinforcement frame may include a second base portion overlying the first base portion and fixed to the shaft, a second side wall portion provided at one end of the second base portion in the width direction and extending from the one end of the second base portion in a direction away from the seat frame such that the second side wall portion and the first side wall portion lie one over another, and a second folded-back portion extending from an end of the second side wall portion and folded back such that an end of the second folded-back portion points to the second base portion, the second folded-back portion and the first folded-back portion lying one over another. The reinforcement frame and the main frame may be joined together at a first joint portion at which the first folded-back portion and the second folded-back portion lie one over another, and the first joint portion may have a clearance formed between an end of the first joint portion and one of the first side wall portion and the second side wall portion, which is closer to the end of the first joint portion.

With this configuration, the rigidity of the frame of the armrest can be improved as compared with an alternative configuration in which an end of the first joint portion is folded back until it contacts the first side wall or the second side wall.

In the above-described armrest, the main frame may include a third side wall portion provided at another end of the first base portion in the width direction and extending from the another end of the first base portion in a direction away from the seat frame, and a third folded-back portion extending from an end of the third side wall portion and folded back such that an end of the third folded-back portion points to the first base portion, and the reinforcement frame may include a fourth side wall portion provided at another end of the second base portion in the width direction and extending from the another end of the second base portion in a direction away from the seat frame such that the fourth side wall portion and the third side wall portion lie one over another, and a fourth folded-back portion extending from an end of the fourth side wall portion and folded back such that an end of the fourth folded-back portion points to the second base portion, the fourth folded-back portion and the third folded-back portion lying one over another. The reinforcement frame and the main frame may be joined together at the first joint portion and at a second joint portion at which the third folded-back portion and the fourth folded-back portion lie one over another, and the first joint portion and the second joint portion may be provided at positions opposite to each other in the width direction.

With this configuration, since the main frame and the reinforcement frame can be joined firmly, the rigidity of the frame of the armrest can be further improved.

The above-described armrest may further comprise a stopper portion configured to contact a portion of the seat frame to restrict a rotation of the armrest within a limited range, and as viewed from a direction of an axis of rotation of the armrest, the stopper portion may be disposed between the first joint portion and the second joint portion.

With this configuration, since the stopper portion can be arranged compactly, the size of the armrest can be reduced. Further, since the stopper portion is disposed between the first joint portion and the second joint portion that are provided at positions opposite to each other in the width direction and each joins the main frame and the reinforcement frame, it is possible to prevent the main frame and the reinforcement frame from being shifted from each other due to a force applied to the stopper portion.

The above-described armrest may further comprise a stopper portion configured to contact a portion of the seat frame to restrict a rotation of the armrest within a limited range, and the main frame may include a first base portion. The reinforcement frame may include a second base portion overlying the first base portion and fixed to the shaft, the second base portion and the seat frame being disposed on opposite sides of the first base portion. Further, the stopper portion may include a first protruding portion protruding from the second base portion toward the seat frame.

With this configuration, since the stopper portion is formed by the reinforcement plate having a thickness larger than that of the main frame, even if a large force is applied to the armrest, the stopper portion can restrict the rotation of the armrest with stability. This can improve a robust and stable feel which a user experiences when putting his/her arm on the armrest. Further, a force applied to the stopper portion can be received by the first protruding portion, that is, the reinforcement frame, so that the thickness of the main frame can be reduced accordingly. As a result, the armrest can be made lighter in weight.

In the above-described armrest, the stopper portion may further include a hollow second protruding portion protruding from the first base portion toward the seat frame, and the first protruding portion may be fitted in a recess portion formed in a reverse side of the second protruding portion.

With this configuration, since the stopper portion is formed as a double-walled structure, the rigidity of the stopper portion can be improved. This can restrict the rotation of the armrest more stably, so that the robust and stable feel which a user experiences when putting his/her arm on the armrest can be further improved.

In the above-described armrest, the main frame may include a proximal end portion located closer to a rotation center of the armrest, and a distal end portion located farther from the rotation center, and the stopper portion may be disposed between the rotation center and the distal end portion in a longitudinal direction of the main frame.

This configuration can make the distance from the stopper portion to the distal end portion shorter than the distance from the rotation center to the distal end portion, so that even if a force is applied to the armrest while the stopper portion restricts the rotation of the armrest within a limited range, the frame of the armrest is less likely to deform. This can improve the robust and stable feel which the user experiences when putting his/her arm on the armrest can be improved. Further, as the required rigidity is lessened, the thickness of the main frame can be further made smaller. As a result, the armrest can be further made lighter.

In the above-described armrest, the main frame may include a proximal end portion located closer to a rotation center of the armrest, a distal end portion located farther from the rotation center, and a plurality of lightening holes disposed in line along a longitudinal direction of the main frame. The plurality of lightening holes may comprise a first lightening hole located closest to the distal end portion and elongated in the longitudinal direction, and a plurality of second lightening holes located between the first lightening hole and the rotation center, the second lightening holes being smaller in size than the first lightening hole.

With this configuration, since the main frame has a plurality of lightening holes, the armrest can be further made lighter. Portions located between adjacent lightening holes form reinforcement portions connected in the width direction orthogonal to the longitudinal direction of the main frame, and the number of reinforcement portions per unit length in the longitudinal direction of the main frame is larger at the proximal end side where the plurality of second lightening holes are formed than at the distal end side where the first lightening hole is formed. This can improve the rigidity at the proximal end portion side of the frame of the armrest which is likely to receive a large bending moment.

In the above-described armrest, the reinforcement frame may be disposed closer to the proximal end portion than the plurality of lightening holes.

With this configuration, since no lightening hole is formed in the portion of the main frame at which the reinforcement frame is provided, the rigidity of the frame of the armrest near the shaft can be improved.

There is also provided a one-way clutch for a rotatable frame configured to be rotatable relative to a seat frame, the one-way clutch being switchable between a locked state in which rotation of the rotatable frame in one direction is restricted and an unlocked state in which rotation of the rotatable frame in two directions is allowed, the one-way clutch comprising: a stationary frame fixed to the seat frame; a shaft fixed to the rotatable frame and rotatable relative to the stationary frame; a lock spring including a coil portion fitted onto an outer peripheral surface of the shaft, a fixed end portion fixed to the stationary frame, and a free end portion not fixed to the stationary frame, the lock spring being configured to restrict the rotation of the rotatable frame in said one direction with the coil portion tightening the shaft; an acting portion provided on the shaft and configured to press the free end portion to enlarge the diameter of the lock spring; and a retaining portion engageable with the free end portion in a circumferential direction of the coil portion so as to retain the lock spring whose diameter has been enlarged by the acting portion in an enlarged state, wherein the retaining portion is provided on the stationary frame.

With this configuration, since the retaining portion retaining the lock spring in the enlarged state is provided on the stationary frame that is fixed to the seat frame, as compared with an alternative configuration in which the retaining portion is provided on a member other than the stationary frame, the number of parts for the one-way clutch can be reduced.

In the above-described one-way clutch, the retaining portion may be formed integrally with the stationary frame.

This configuration can reduce the number of parts for the one-way clutch as compared with an alternative configuration in which the retaining portion is fixed to and thus provided on the stationary frame.

In the above-described one-way clutch, the retaining portion may have a first retaining surface configured to engage with the free end portion in the circumferential direction when the one-way clutch is in the unlocked state, thereby retaining the lock spring in the enlarged state, and a second retaining surface extending from the first retaining surface and configured to contact the free end portion in an axial direction of the lock spring when the one-way clutch is in the locked state, thereby retaining the free end portion to deform in the axial direction, wherein the second retaining surface inclines such that the free end portion deforms more with distance from the first retaining surface.

With this configuration, when the free end portion of the lock spring moves from a position supported by the first retaining surface to a position supported by the second retaining surface, the free end portion moves along the second retaining surface in a direction away from the first retaining surface by the tightening force of the lock spring with which the shaft is tightened by the lock spring. However, since the second retaining surface inclines such that the free end portion deforms more with distance from the first retaining surface, an abrupt movement of the free end portion can be prevented. Accordingly, the lock spring is prevented from abruptly contacting the shaft when the lock spring in the enlarged state tightens, so that contact noise of the lock spring can be reduced.

The above-described one-way clutch may further comprise a nut to which a bolt for fixing the shaft to the rotatable frame is fastened, and the shaft may have a tubular shape and the nut may be disposed inside the shaft.

With this configuration, as compared with an alternative configuration in which a nut is disposed outside (around) the shaft, the one-way clutch can be made smaller in size.

In the above-described one-way clutch, the shaft has an end portion in the axial direction of the lock spring and a portion of the end portion may be bent inwardly to form a bent portion, and the nut may be joined to the bent portion.

This configuration makes it possible to eliminate the need for providing a part for joining the nut to the shaft, so that the number of parts can be reduced.

In the above-described one-way clutch, the stationary frame may include a recess portion with which the fixed end portion is engaged.

With this configuration, the fixed end portion of the lock spring is brought into engagement with the recess portion of the stationary frame to thereby stationarily fix the fixed end portion to the stationary frame. This configuration makes it possible to eliminate the need for providing a part for holding the fixed end portion, so that the number of parts can be reduced.

In the above-described one-way clutch, the shaft may include a restriction portion configured to engage with the free end portion in the circumferential direction to restrict the rotation of the rotatable arm within a limited range.

This configuration makes it possible to eliminate the need for providing a part for restricting the rotation of the rotatable arm within a limited range, so that the number of parts can be reduced.

In the above-described one-way clutch, the stationary frame may be a side frame constituting a lateral frame of the seat frame. As an alternative, the stationary frame may be a bracket configured to accommodate the shaft and the lock spring, the bracket being disposed between the seat frame and the rotatable frame and fixed to the seat frame.

BRIEF DESCRIPTION OF DRAWINGS

FIG. 2 includes a view (a) explaining a stowing operation of an armrest, and a view (b) explaining a folding out operation of the armrest.

FIG. 11 includes views (a) to (c) showing states of various parts when the armrest has been rotated from position A to a position short of position B.

FIG. 12 includes views (a) to (c) showing states of various parts when the armrest has been rotated from position A to position B.

FIG. 13 includes views (a) to (c) showing states of various parts when the armrest has been rotated from position B to position C.

FIG. 14 includes views (a) to (c) showing states of various parts when the armrest has been rotated from position C to a position short of position A.

FIG. 16 includes views (a) to (c) explaining a one-way clutch including a shaft according to a modified embodiment.

FIG. 17 includes a view (a) showing a retaining portion according a modified embodiment as viewed from a front side, and a view (b) explaining the operation of the retaining portion.

FIG. 18 includes an exploded perspective view (a) showing a one-way clutch including a bracket according to a modified embodiment, and a sectional view (b) showing a state in which a fixed end portion is engaged with a recess portion of the bracket.

DESCRIPTION OF EMBODIMENTS

One embodiment of the present invention will be described with reference made to the accompanying drawings.

Figure 1:
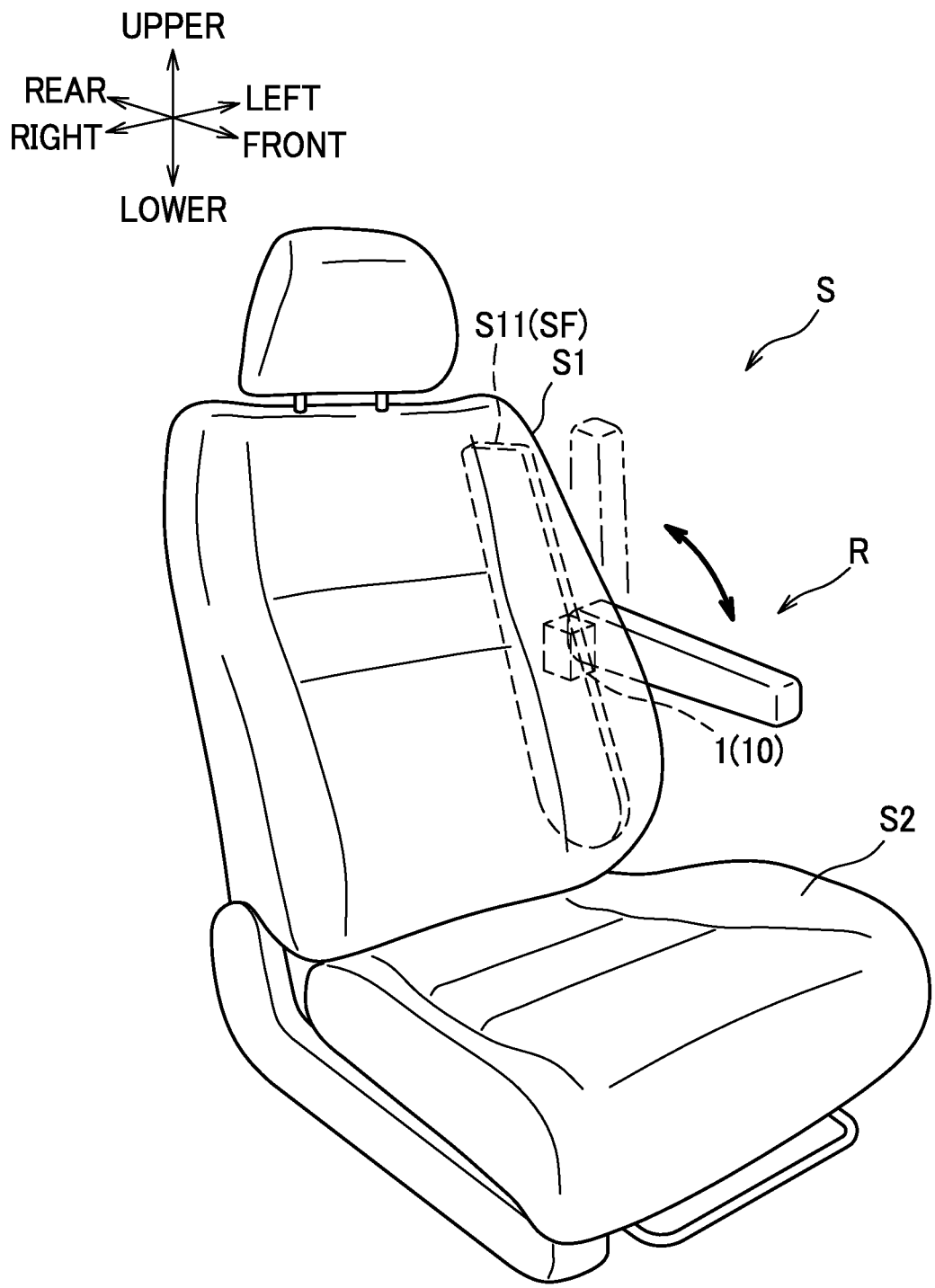
FIG. 1 is a perspective view of a vehicle seat according to one embodiment.

As seen in FIG. 1, a vehicle seat according to one embodiment is configured, for example, as a car seat S installed in an automobile. The car seat S includes various parts such as a seat back S1, a seat cushion S2, and an armrest R. In the following description, directions such as front/rear (frontward/rearward), right/left (rightward/leftward; lateral), upper/lower (upward/downward; top/bottom) correspond to the directions designated as from the viewpoint of an occupant seated on the car seat S.

The car seat S includes a seat frame SF constituting a framework; the seat frame SF is made of metal. The car seat S is configured to have the seat frame SF upholstered with a pad material made of urethane foam or the like, and an outer covering material made of leather, fabrics or the like. The seat frame SF includes a side frame S11 of the seat back S1 as a side frame constituting a lateral frame of the seat frame SF.

The armrest R is disposed on the left side of the seat back S1, and fixed to a shaft 20 (see FIG. 3) of a one-way clutch 1. The one-way clutch 1 is provided on the side frame S11 constituting a part of the seat frame SF. The armrest R and the shaft 20 of the one-way clutch 1 are rotatable together relative to the side frame S11.

To be more specific, as seen in FIG. 2(a), the armrest R is rotatable and thus switchable between a folded out state (i.e., position A) in which a distal end thereof faces frontward and a stowed state (i.e., position C) in which the distal end thereof faces upward. The armrest R is configured such that when the armrest R is being stowed and shifted from the folded out state toward the stowed state, the armrest R positioned at any angle within a predetermined range from a position in the folded out state to a position on its way toward the stowed state (i.e., from position A to position B) is in the locked state and the rotation thereof in one direction (specifically, downward direction) is prevented by the one-way clutch 1. To give more details, the armrest R in the locked state can be rotated in an upward direction but cannot be rotated in a downward direction. Further, the armrest R is configured such that when the armrest R is being stowed and moved throughout the range from position B to position C, the armrest R is in an unlocked state and the rotation thereof in two directions (specifically, upward and downward directions) is allowed.

Further, as seen in FIG. 2(b), the armrest R is configured such that when the armrest R is being folded out and shifted from the stowed state (at position C) toward the folded out state (at position A), the armrest R is in the unlocked state and the rotation thereof in the upward and downward directions is allowed. The armrest R returns to the locked state when moved completely to position A in the folding out operation, As described above, the armrest R is configured to be switchable between the locked state and the unlocked state by the one-way clutch 1.

Figure 3:
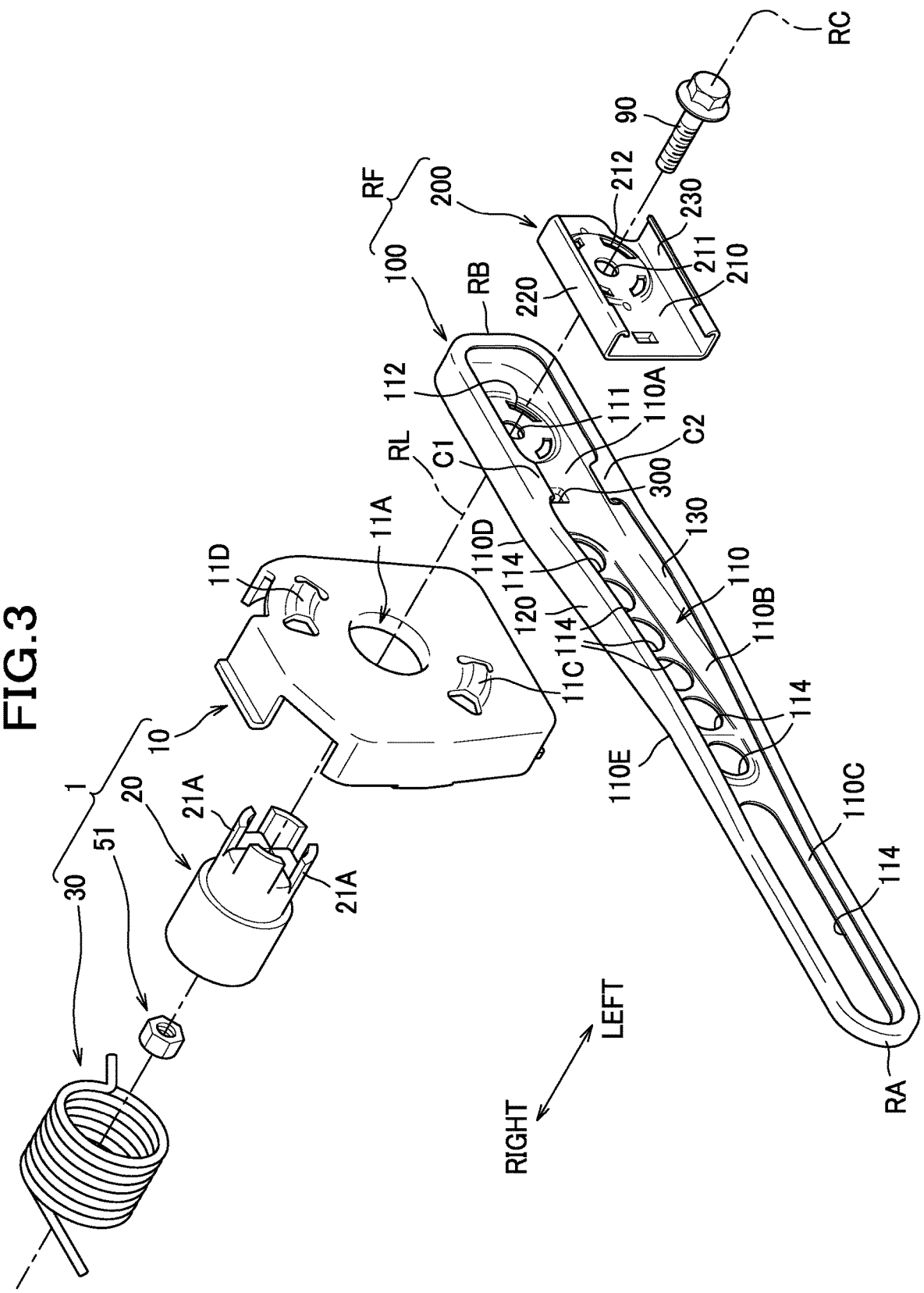
FIG. 3 is an exploded perspective view of an armrest frame and a one-way clutch.

As seen in FIG. 3, the armrest R includes an armrest frame RF as a rotatable frame configured to be rotatable relative to the seat frame SF. Although not shown in the drawings, the armrest frame RF is covered with an outer covering material made of leather, fabrics or the like, and foamed plastic such as foamed polyurethane is injected into a gap formed between the armrest frame RF and the outer covering material, to thereby form the armrest R. The armrest frame RF includes an elongate main frame 100, and a reinforcement frame 200 fixed to the shaft 20 of the one-way clutch 1 through the main frame 100.

The main frame 100 is a member constituting a framework of the armrest R. The main frame 100 is made by press working sheet metal. To be more specific, the main frame 100 has a substantially arcuate cross-sectional shape (see FIG. 6); an elongate-shaped plate member is bent at its peripheral edge portions toward the left side (i.e., to the side away from the seat frame SF), and distal end portions of these bent portions are further bent inwardly.

In the following description, an end portion at one end in the longitudinal direction of the main frame 100 (armrest R) located closer to a rotation center RC of the armrest R is referred to as a proximal end portion RB, and an end portion at another end in the longitudinal direction of the main frame 100 (armrest R) located farther from the rotation center RC is referred to as a distal end portion RA. Further, in the following description, a longitudinal (lengthwise) direction of the main frame 100 (armrest R) is simply referred to as a "longitudinal direction", and a transverse direction of the main frame 100 orthogonal to the longitudinal direction and a lateral direction is referred to as a "width direction".

The main frame 100 mainly includes an elongate-shaped first base portion 110, a first side wall portion 120 provided at one end of the first base portion 110 in the width direction and extending leftward from the one end, and a third side wall portion 130 provided at the other end of the first base portion in the width direction and extending leftward from the other end.

Figure 4:
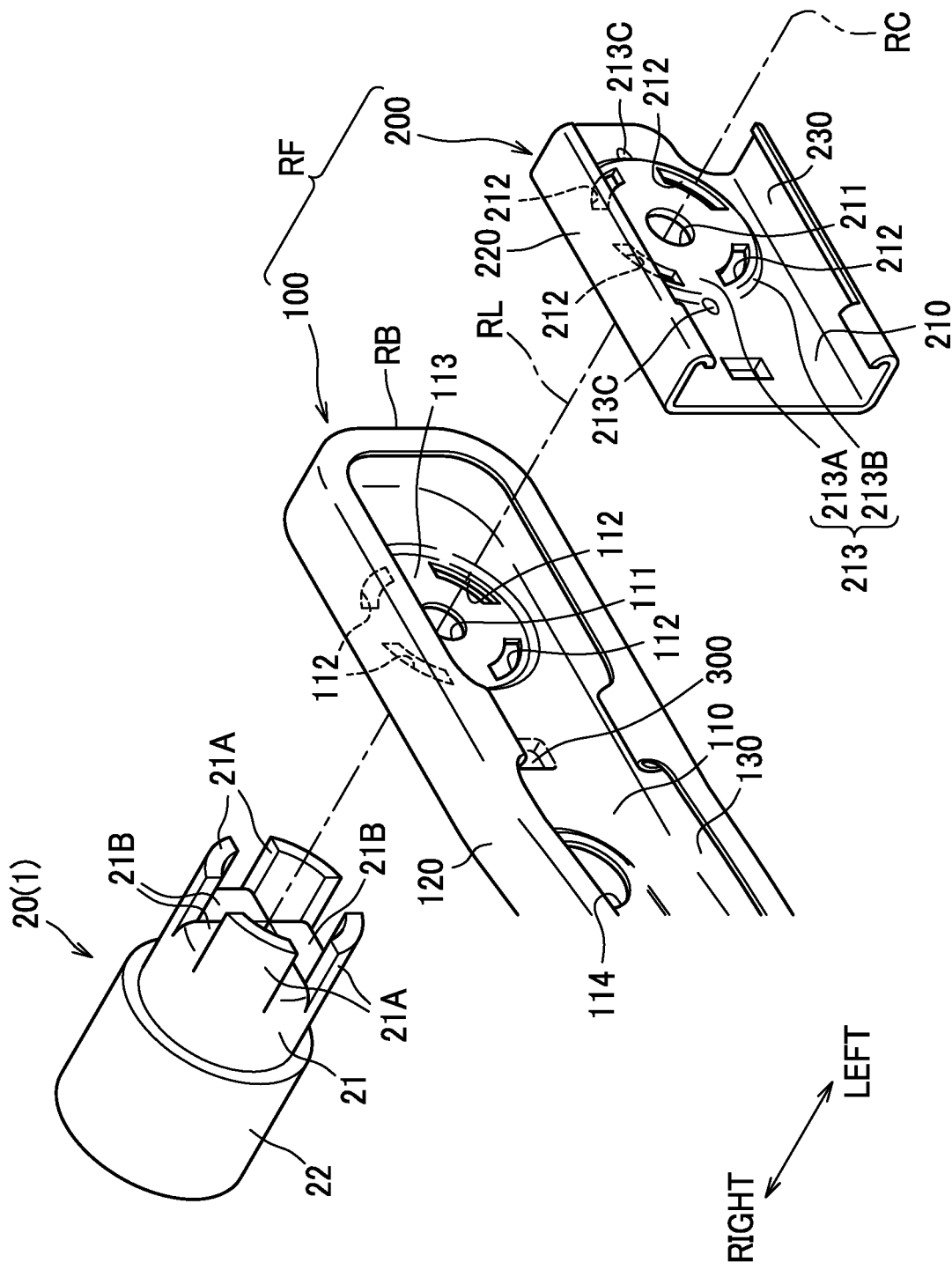
FIG. 4 is an enlarged perspective view of a proximal end portion of the armrest frame and a shaft of the one-way clutch.

As seen in FIG. 4, the proximal end portion RB of the first base portion 110 has an insertion hole 111 and through-holes 112. To be more specific, the proximal end portion RB of the first base portion 110 has a recess portion 113 recessed toward the right side (toward the seat frame SF); the insertion hole 111 and the through-holes 112 are formed in a bottom portion of the recess portion 113. As seen from a direction in which an axis of rotation RL of the armrest R extends, that is, from the lateral direction, the recess portion 113 is formed to have a substantially circular shape whose center coincides with the rotation center RC.

The insertion hole 111 is a hole through which a bolt 90 (see FIG. 3) for fixing the shaft 20 of the one-way clutch 1 to the armrest frame RF is inserted. The insertion hole 111 is disposed substantially at the center of the bottom portion of the recess portion 113, and has a substantially circular shape whose center coincides with the rotation center RC.

A through-hole 112 is a hole through which a protruding portion 21A of the shaft 20 extends. The through-hole 112 is provided at plural positions corresponding to a plurality of protruding portions 21A of the shaft 20 (specifically, four through-holes 112 are formed corresponding to four protruding portions 21A). Each of the through-holes 112 is formed to have a substantially circular arc shape whose center of curvature coincides with the rotation center RC. The four through-holes 112 are arranged around the insertion hole 111, substantially at regular intervals on a circle whose center coincides with the rotation center RC.

Figure 5:
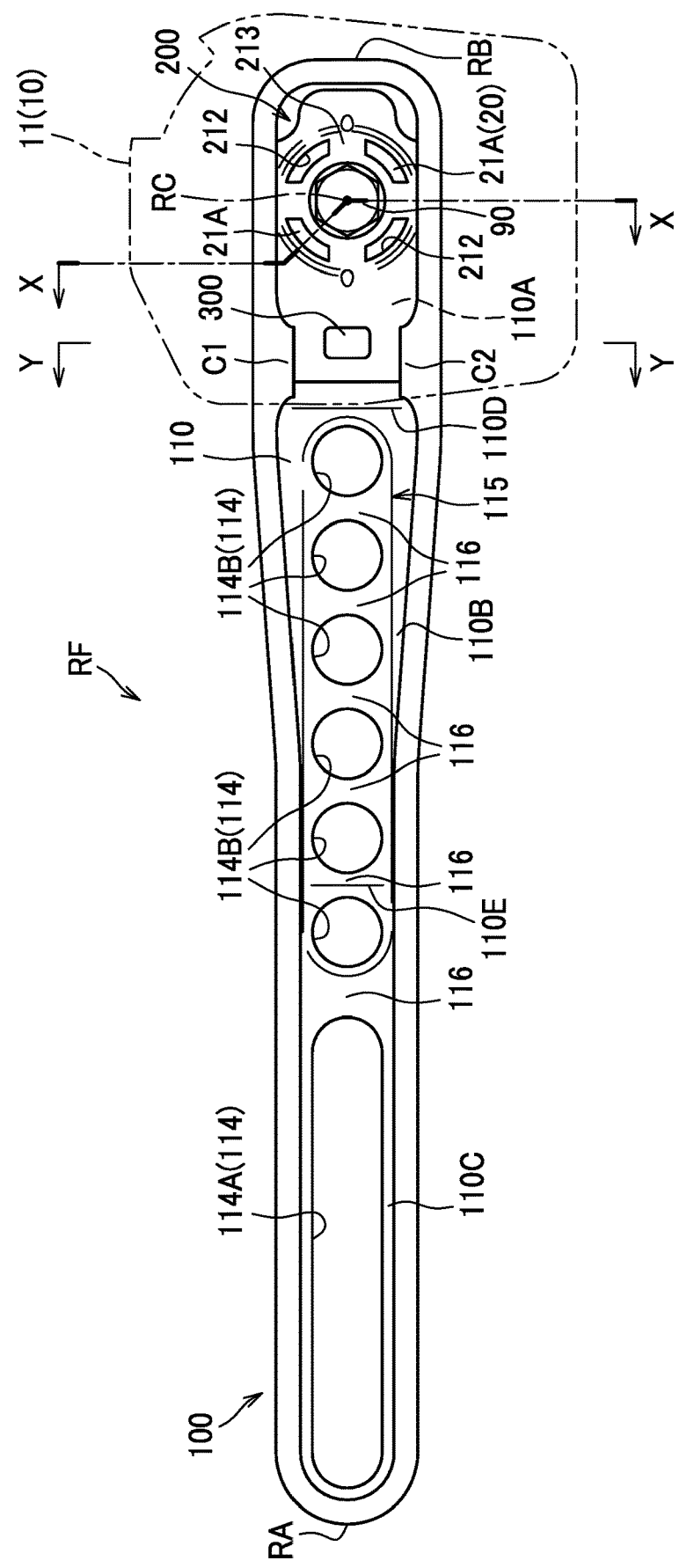
FIG. 5 is a side view of the armrest frame.

As seen in FIG. 5, a plurality of lightening holes 114 are formed in the first base portion 110; the lightening holes 114 are disposed in line along the longitudinal direction. The plurality of lightening holes 114 includes a first lightening hole 114A and second lightening holes 114B.

The first lightening hole 114A is a hole located closest to the distal end of the distal end portion RA among the plurality of lightening holes 114. The first lightening hole 114A is formed to have a substantially oblong shape extending long in the longitudinal direction. To be more specific, the first lightening hole 114A is formed in the distal end portion RA of the first base portion 110. The first lightening hole 114A has a length substantially corresponding to one third of the whole length of the first base portion 110 in the longitudinal direction, and extends long from the distal end portion RA toward the proximal end portion RB.

The second lightening holes 114B are holes located between the first lightening hole 114A and the rotation center RC; each of the second lightening hole 114B is formed to have a substantially circular shape smaller than the first lightening hole 114A. The length (diameter) of the second lightening hole 114B in the width direction is substantially the same as the length of the first lightening hole 114A in the width direction. A plurality of second lightening holes 114B are disposed in line along the longitudinal direction. To be more specific, a substantially oblong-shaped protruding portion 115 that protrudes toward the left side is formed on the first base portion 110 substantially at its center portion in the longitudinal direction, and the second lightening holes 114B arranged in a row along the longitudinal direction are formed in the protruding portion 115. A portion located between two adjacent lightening holes 114 forms a reinforcement portion 116 extending in the width direction to connect one end portion and the other end portion of the first base portion 110 in the width direction.

As seen in FIG. 3, the first base portion 110 includes a first portion 110A that is a portion on the proximal end portion RB side, a third portion 110C that is a portion on the distal end portion RA side, and a second portion 110B that is a portion located between the first portion 110A and the third portion 110C. The first portion 110A is provided to be substantially orthogonal to the axis of rotation RL. The second portion 110B is bent to the left side at a first bent portion 110D from an end of the first portion 110A located closer to the distal end portion RA, and extends to the left side as it approaches the distal end portion RA. The third portion 110C is bent to the right side at a second bent portion 110E from an end of the second portion 110B located closer to the distal end portion RA, and extends substantially parallel to the first portion 110A.

As seen in FIG. 5, the first base portion 110 is bent at a portion located between the first portion 110A and the second portion 110B where a lightening hole 114 is not formed, and at a portion located between the second portion 110B and the third portion 110C where no lightening hole 114 is formed, respectively. In other words, in the longitudinal direction each of the first bent portion 110D and the second bent portion 110E is formed in a region where no lightening hole 114 is formed. To be more specific, the first bent portion 110D is formed between the protruding portion 115 and a stopper portion 300 to be described later. The second bent portion 110E is formed in a reinforcement portion 116 that is formed between the second lightening hole 114B disposed closest to the first lightening hole 114A and the second lightening hole 114B disposed adjacent to this second lightening hole 114B (i.e., between the leftmost second lightening hole 114B and the second lightening hole 114B next to the leftmost second lightening hole 114B in FIG. 5).

As seen in FIG. 4, the reinforcement frame 200 is a member for reinforcing the main frame 100. Similar to the main frame 100, the reinforcement frame 200 is made by press working sheet metal. To be more specific, the reinforcement frame 200 has a cross-sectional shape such that two end portions of a plate member in the width direction are bent toward the left side. The reinforcement frame 200 is made of a plate member having a thickness larger than that of a plate member for the main frame 100. As an example, the reinforcement frame 200 is 1.5 times thicker than the main frame 100.

The reinforcement frame 200 mainly includes a second base portion 210, a second side wall portion 220 provided at one end of the second base portion 210 in the width direction and extending leftward from the one end, and a fourth side wall portion 230 provided at the other end of the second base portion 210 in the width direction and extending leftward from the other end.

The second base portion 210 has an insertion hole 211 and engagement holes 212. To be more specific, the second base portion 210 has a protruding portion 213 protruding toward the left side; the insertion hole 211 and the engagement holes 212 are formed in the protruding portion 213.

The insertion hole 211 is a hole through which the bolt 90 (see FIG. 3) is inserted. The insertion hole 211 is disposed substantially at the center of the protruding portion 213, and has a substantially circular shape whose center coincides with the rotation center RC. A peripheral edge portion of the insertion hole 211 forms a flange portion 211A protruding to the right side (see FIG. 6).

An engagement hole 212 is a hole with which a protruding portion 21A of the shaft 20 is engageable. The engagement hole 212 is provided at plural positions corresponding to the plurality of protruding portions 21A of the shaft 20 (specifically, four engagement holes 212 are formed corresponding to four protruding portions 21A). Each of the engagement holes 212 is formed to have a substantially circular arc shape whose center of curvature coincides with the rotation center RC. The four engagement holes 212 are arranged around the insertion hole 211, substantially at regular intervals on a circle whose center coincides with the rotation center RC, in such a manner as to exactly overlap with the through-holes 112 of the main frame 100 as seen from the lateral direction.

The protruding portion 213 is formed to have a substantially circular shape whose center coincides with the rotation center RC; as seen from the lateral direction, the protruding portion 213 is sized such that the recess portion 113 of the main frame 100 and the protruding portion 213 is almost coextensive with the other. The protruding portion 213 includes a first portion 213A disposed in a position shifted from the second base portion 210 to the left side, and a second portion 213B connecting a peripheral edge portion of the first portion 213A having a substantially circular shape and the second base portion 210. The first portion 213A is parallel to the second base portion 210. Reinforcement portions 213C are formed on both ends of the second portion 213B in the longitudinal direction; each of the reinforcement portions 213C protrudes leftward from the second portion 213B and the second base portion 210 and elongates in the longitudinal direction.

Figure 6:
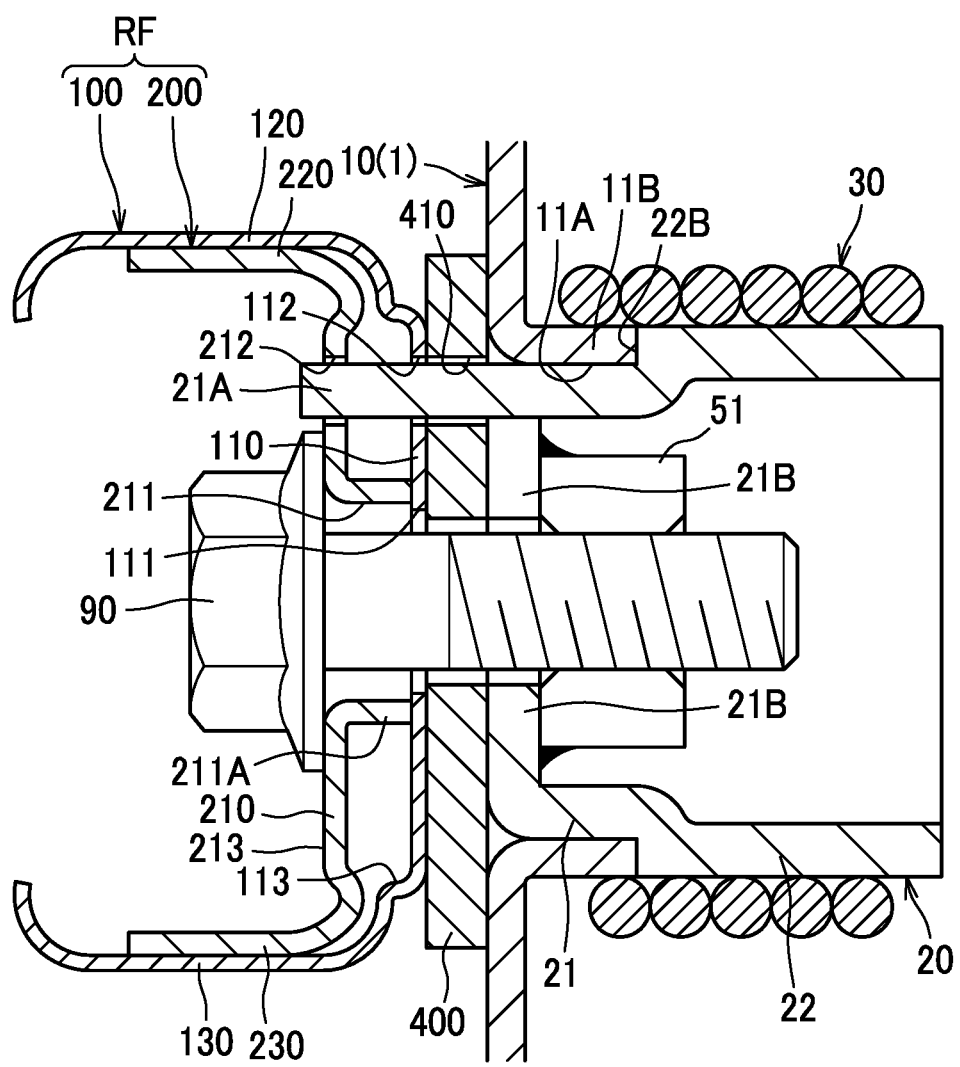
FIG. 6 is a sectional view taken along the line X-X of FIG. 5.
Figure 7:
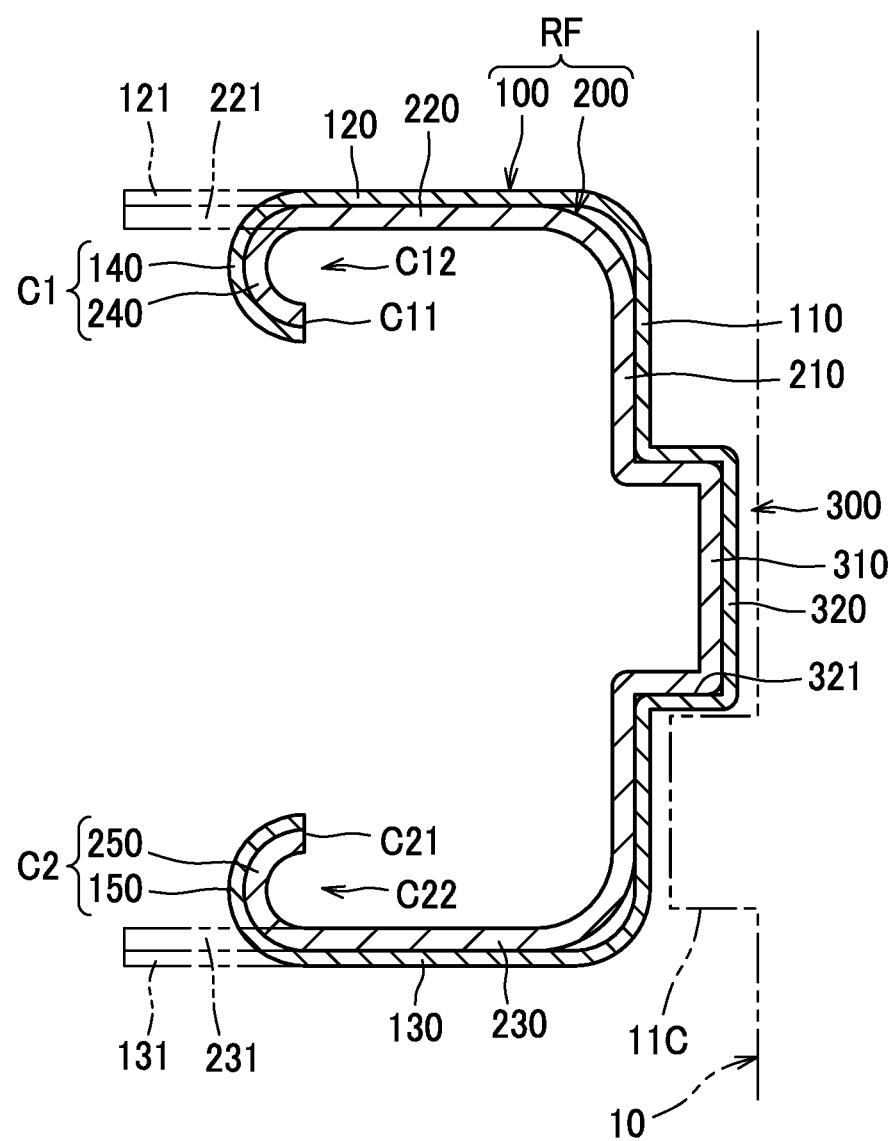
FIG. 7 is a sectional view taken along the line Y-Y of FIG. 5.

As seen in FIG. 5, the reinforcement frame 200 is provided to overlie the main frame 100 at a position closer to the proximal end portion RB than the plurality of lightening holes 114. To be more specific, as seen in FIGS. 6 and 7, the reinforcement frame 200 is provided such that the second base portion 210 overlies the first base portion 110 with the first base portion 110 disposed between the second base portion 210 and the bracket 10 (seat frame SF) for the one-way clutch 1. Further, the reinforcement frame 200 is provided such that the second side wall portion 220 overlies the first side wall portion 120 inside the first side wall portion 120 in the width direction, and that the fourth side wall portion 230 overlies the third side wall portion 130 inside the third side wall portion 130 in the width direction.

As seen in FIGS. 5 and 7, the reinforcement frame 200 and the main frame 100 are joined together at a first joint portion C1 and at a second joint portion C2. As seen in FIG. 7, the first joint portion C1 is a portion at which a first folded-back portion 140 formed in the main frame 100 and a second folded-back portion 240 formed in the reinforcement frame 200 lie one over another. Further, the second joint portion C2 is a portion at which a third folded-back portion 150 formed in the main frame 100 and a fourth folded-back portion 250 formed in the reinforcement frame 200 lie one over another.

The first folded-back portion 140 is a portion extending from an end of the first side wall portion 120 and folded back such that an end of the first folded-back portion 140 points to the first base portion 110, and the third folded-back portion 150 is a portion extending from an end of the third side wall portion 130 and folded back such that an end of the third folded-back portion 150 points to the first base portion 110. Further, the second folded-back portion 240 is a portion extending from an end of the second side wall portion 220 and folded back such that an end of the second folded-back portion 240 points to the second base portion 210 to overlie the first folded-back portion 140, and the fourth folded-back portion 250 is a portion extending from an end of the fourth side wall portion 230 and folded back such that an end of the fourth folded-back portion 250 points to the second base portion 210 to overlie the third folded-back portion 150.

Joining between the main frame 100 and the reinforcement frame 200 will be described.

Before the main frame 100 is joined to the reinforcement frame 200, the main frame 100 includes a first extension portion 121 extending protrusively leftward from a portion of the end of the first side wall portion 120, and a third extension portion 131 extending protrusively leftward from a portion of the end of the third side wall portion 130. Similarly, before the reinforcement frame 200 is joined to the main frame 100, the reinforcement frame 200 has a second extension portion 221 extending protrusively leftward from a portion of the end of the second side wall portion 220, and a fourth extension portion 231 extending protrusively leftward from a portion of the end of the fourth side wall portion 230.

When joining the main frame 100 and the reinforcement frame 200 together, the reinforcement frame 200 is first disposed inside the main frame 100 and laid over the main frame 100 such that the second extension portion 221 overlies the inner side of the first extension portion 121 in the width direction and the fourth extension portion 231 overlies the inner side of the third extension portion 131 in the width direction. Further, the overlain extension portions 121, 221 are bent inward in the width direction and then rightward so that ends thereof face to the second base portion 210 to form the first joint portion C1. Similarly, the overlain extension portions 131, 231 are bent inward in the width direction and then rightward so that ends thereof point to the second base portion 210 to form the second joint portion C2. Accordingly, the main frame 100 and the reinforcement frame 200 are joined at the joint portions C1, C2.

The first joint portion C1 and the second joint portion C2 are bent substantially in the form of a segment of a circle in cross section. Accordingly, the first joint portion C1 has a clearance C12 formed between an end C11 of the first joint portion C1 and one of the first side wall portion 120 and the second side wall portion 22, which is closer to the end C11 of the first joint portion C1 (more specifically, the second side wall portion 220 located inward in the width direction). Similarly, the second joint portion C2 has a clearance C22 formed between an end C21 of the second joint portion C2 and one of the third side wall portion 130 and the fourth side wall portion 230, which is closer to the end C21 of the second joint portion C2 (more specifically, the fourth side wall portion 230 located inward in the width direction). As seen in FIG. 5, the first joint portion C1 and the second joint portion C2 are provided at opposed positions in the width direction in a substantially symmetrical manner.

The armrest frame RF is provided with a stopper portion 300; the stopper portion 300 contacts the bracket 10 (i.e., a portion of the seat frame SF) for the one-way clutch 1 that is fixed to the side frame S11, to restrict rotation of the armrest R within a limited range. To be more specific, the stopper portion 300 restricts a downward rotation of the armrest R beyond position A when it contacts a first projection 11C (see FIG. 3) provided on the bracket 10. Further, the stopper portion 300 restricts a rearward rotation of the armrest R beyond position C when it contacts a second projection 11D (see FIG. 3) provided on the bracket 10.

As seen from the lateral direction, the stopper portion 300 is provided within the range of the bracket 10. To be more specific, the stopper portion 300 is located within the contour of a base portion 11 of the bracket 10. Further, the stopper portion 300 is located between the rotation center RC and the distal end portion RA in the longitudinal direction. To be more specific, the stopper portion 300 is located between the protruding portion 213 and the first bent portion 110D and between the first joint portion C1 and the second joint portion C2.

As seen in FIG. 7, the stopper portion 300 includes a first protruding portion 310 formed on the reinforcement frame 200 and a second protruding portion 320 formed on the main frame 100. The first protruding portion 310 is a hollow protruding portion protruding rightward from the second base portion 210, and the second protruding portion 320 is a hollow protruding portion protruding rightward from the first base portion 110. The first protruding portion 310 protrudes rightward farther than the first base portion 110, and is fitted in a recess portion 321 formed in the reverse side of the second protruding portion 320. Accordingly, the stopper portion 300 is formed as a protruding portion of a double-walled structure made by the first protruding portion 310 and the second protruding portion 320 lying one over another. This stopper portion 300 may be formed, for example, by placing the main frame 100 and the reinforcement frame 200 one over another and joining the main frame 100 and the reinforcement frame 200 together, followed by drawing process.

Figure 8:
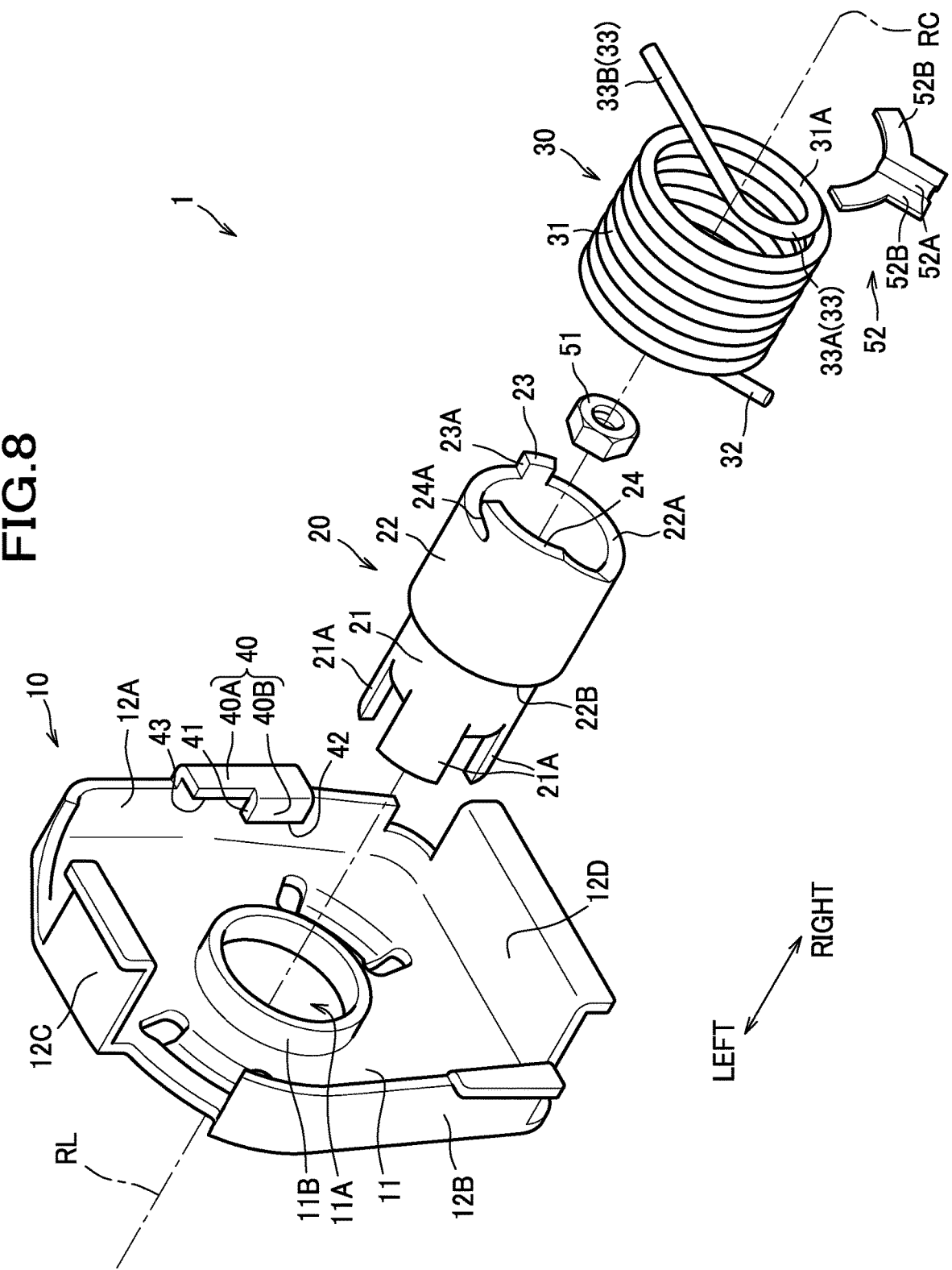
FIG. 8 is an exploded perspective view of the one-way clutch.

As seen in FIG. 8, the one-way clutch 1 is a mechanism for switching the armrest R between a locked state and an unlocked state. The one-way clutch 1 is located between the side frame S11 and the armrest R (see FIG. 1). In the locked state, the one-way clutch 1 restricts the rotation of the armrest R in the downward direction, while allowing the rotation in the upward direction. In the unlocked state, the one-way clutch 1 allows the rotation of the armrest R in the upward and downward directions.

The one-way clutch 1 mainly includes the bracket 10 as a stationary frame that is fixed to the side frame S11, the shaft 20 rotatable relative to the bracket 10, a lock spring 30 fitted onto and attached to the outer peripheral surface of the shaft 20, a retaining portion 40, a nut 51 in which a bolt 90 (see FIG. 3) is screwed, and a fixture member 52.

The bracket 10 is a member for storing various parts, such as the shaft 20 and the lock spring 30. The bracket 10 is disposed between the side frame S11 and the armrest frame RF. The bracket 10 is made by sheet metal working of a metal plate, and mainly includes a base portion 11, and four side wall portions 12A-12D extending rightward from front, rear, upper and lower ends of the base portion 11.

The base portion 11 is a substantially rectangular plate configuration, and at its substantially center portion, a hole 11A is formed for the shaft 20 to be inserted. The peripheral edge portion of the hole 11 is provided with a flange portion 11B formed to protrude rightward by a burring process or the like. Further, as seen in FIG. 3, a first projection 11C protruding leftward (toward the armrest frame RF) is formed on the base portion 11 substantially at the front side of the hole 11A, and a second projection 11D protruding leftward is formed on the base portion 11 substantially at the rear side of the hole 11A such that the hole 11A is disposed between the first projection 11C and the second projection 11D.

As seen in FIG. 8, the side wall portions 12A-12D are formed to cover the shaft 20, the lock spring 30 and other parts from front, rear, upper and lower sides. The bracket 10 is fixed to the side frame S11, for example, by welding the right end portions of the rear, upper and lower side wall portions 12B-12D to the side frame S11.

The shaft 20 is a substantially tubular member made of metal; the first portion 21 thereof disposed on the left side is slightly smaller in diameter than the second portion 22 thereof disposed on the right side, so that the first portion 21 can be inserted through the hole 11A of the bracket 10. A plurality of (more specifically, four) protruding portions 21A that protrude toward the armrest frame RF are provided at the left end portion of the first portion 21 in the axial direction (i.e., direction in which the axis of rotation RL extends) of the lock spring 30. Each of the four protruding portions 21A is formed to have a substantially circular arc shape whose center coincides with the rotation center RC. The four protruding portions 21A are arranged substantially at regular intervals on a circle whose center coincides with the rotation center RC, corresponding to the through-holes 112 and the engagement holes 212 of the armrest frame RF (see FIG. 4).

Further, as seen in FIG. 6, portions laid between the protruding portions 21A at the left end portion of the first portion 21 are bent substantially at 90 degrees toward the radially inward side of the shaft 20 to form a plurality of bent portions 21B. A nut 51 is disposed inside the shaft 20; the nut 51 is joined, for example, by welding to the plurality of bent portions 21B.

The four protruding portions 21A of the shaft 20 (see FIG. 4) extend through through-holes 410 formed in a washer 400 and the through-holes 112 formed in the main frame 100, and are engaged in the engagement holes 212 formed in the reinforcement frame 200. The shaft 20 is fixed to the armrest frame RF (i.e., the armrest R) by inserting the bolt 90 through the insertion hole 211 of the reinforcement frame 200, the insertion hole 111 of the main frame 100, and the washer 400, and then screwing the bolt 90 into the nut 51. Accordingly, the armrest frame RF and the shaft 20 are rotatable together relative to the bracket 10. Although not shown in the figures, like the through-holes 112 and the engagement holes 212, each of the through-holes 410 of the washer 400 is formed to have a substantially circular arc shape. The plurality of through-holes 410 are arranged substantially at regular intervals on a circle whose center coincides with the rotation center RC.

The second portion 22 is configured such that the left end face 22B thereof comes into contact with the end portion of the flange portion 11B. This makes it possible to prevent the armrest frame RF from being disengaged leftward from the bracket 10. Further, as seen in FIG. 8, provided at the right end face 22A of the second portion 22 are an acting portion 23 protruding from the left end face 22A and a cam portion 24.

The acting portion 23 has a pressing surface 23A, by which a free end portion 33 of the lock spring 30 (to be described later) is pressed in the circumferential direction of the shaft 20 to enlarge the diameter of the lock spring 30. The pressing surface 23A provides a flat surface extending along the axial direction of the lock spring 30 and substantially perpendicular to the circumferential direction.

The cam portion 24 protrudes farther than the acting portion 23 from the end face 22A of the shaft 20. The cam portion 24 is spaced apart from the pressing surface 23A of the acting portion 23 in the circumferential direction of the shaft 20. The cam portion 24 has a cam surface 24A facing to the pressing surface 23A in the circumferential direction; the cam surface 24a is a surface that inclines to get closer to the pressing surface 23A with distance from the end face 22A of the shaft 20.

The lock spring 30 is a coil spring made of metal. The lock spring 30 is fitted onto the outer peripheral surface of the shaft 20 and disposed between the base portion 11 of the bracket 10 and the side frame S11. The lock spring 30 has a coil portion 31 fitted onto the outer peripheral surface of the shaft 20, a fixed end portion 32 fixed to the bracket 10 by the fixture member 52, and a free end portion 33 not fixed to the bracket 10.

The coil portion 31 is wound in a winding direction, in which the coil portion 31 causes the armrest R to rotate downward from the fixed end portion 32 toward the free end portion 33. Accordingly, in the locked state, the lock spring 30 restricts the rotation of the armrest R in the downward direction because the coil portion 31 tightens the shaft 20. On the other hand, in the locked state, the rotation of the armrest R in the upward direction is allowed because a frictional force between the shaft 20 and the coil portion 31 loosens the coil portion 31.

The fixed end portion 32 extends radially outward of the coil portion 31 from the left end portion of the coil portion 31. The fixture member 52 is formed by sheet metal working of a metal plate; the fixture member 52 includes an engagement portion 52A engageable with the fixed end portion 32 and having a substantially U-shaped cross-section, and a fixture portion 52B disposed on each side of the engagement portion 52A. The fixed end portion 32 is fixed to the bracket 10, for example, by welding the fixture portions 52B to the right surface of the base portion 11 while the engagement portion 52A engages with the fixed end portion 32 from the right side.

Figure 10:
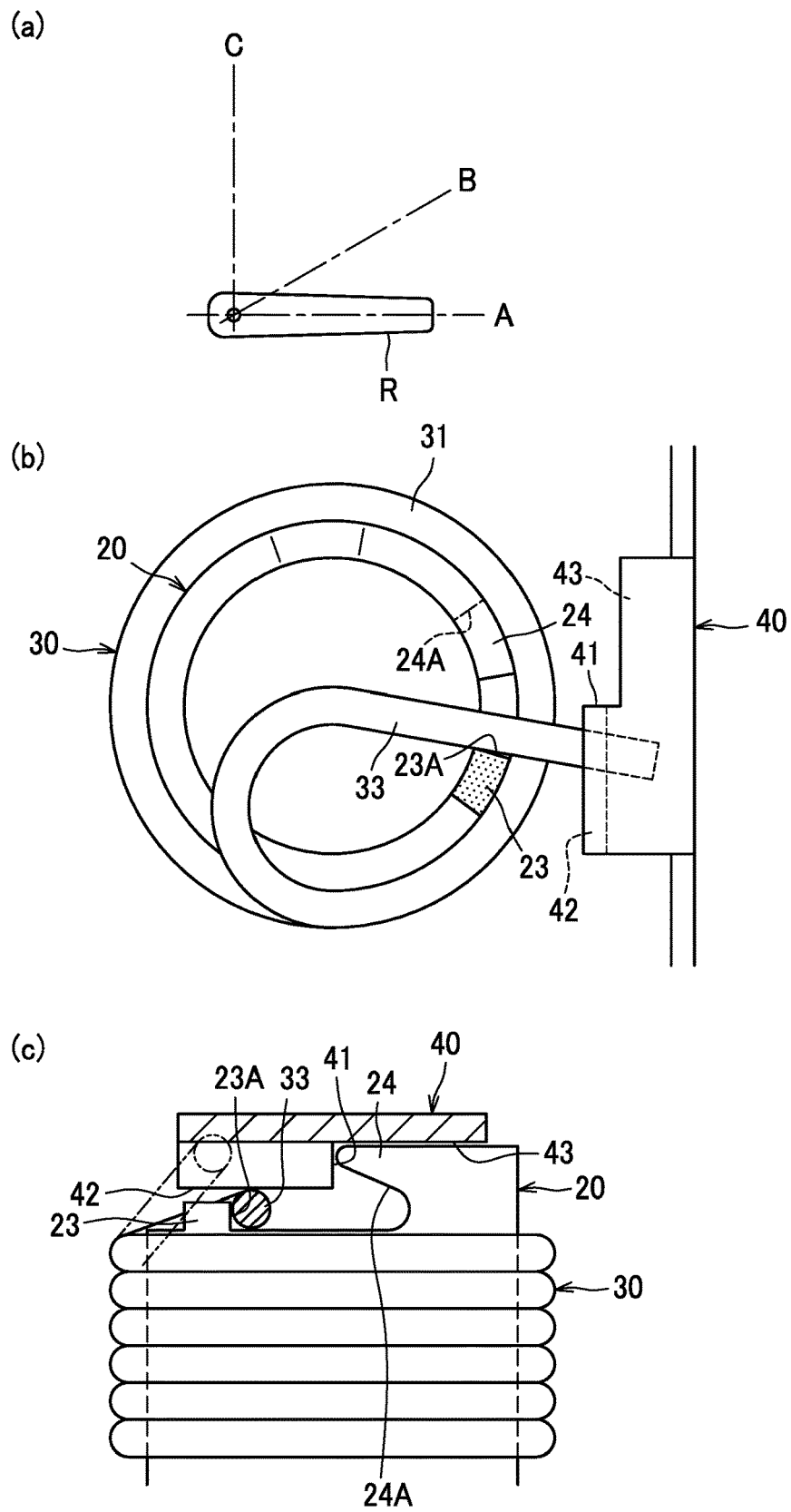
FIG. 10 includes views (a) to (c) showing states of various parts when the armrest is in a folded out state.
Figure 15:
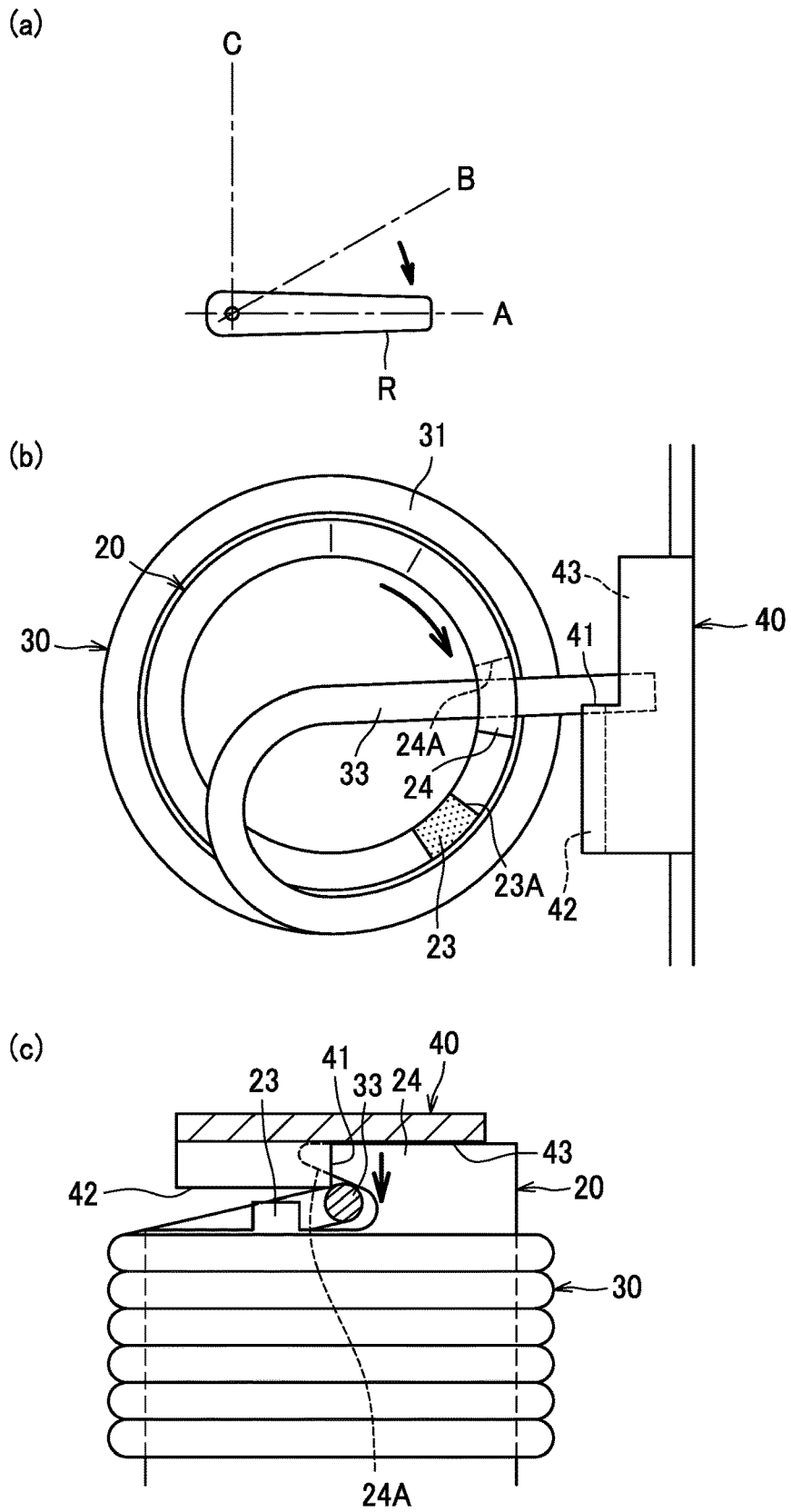
FIG. 15 includes views (a) to (c) showing states of various parts when the armrest has been rotated from a position short of position A to position A.

The free end portion 33 includes a bent portion 33A bent radially inward from the right end portion 31A of the coil portion 31 to form a substantially semi-circular configuration, and a pressed portion 33B extending substantially linearly outward from the bent portion 33A in the radial direction. When the free end portion 33 is not being engaged with the retaining portion 40 and is in a natural state, the free end portion 33 extends away from the coil portion 31 with distance away from the end portion 31A of the coil portion 31 toward the distal end of the free end portion 33. When the free end portion 33 comes into engagement with the retaining portion 40, the pressed portion 33B slightly deforms to approach the coil portion 31 (see FIG. 10).

Figure 9:
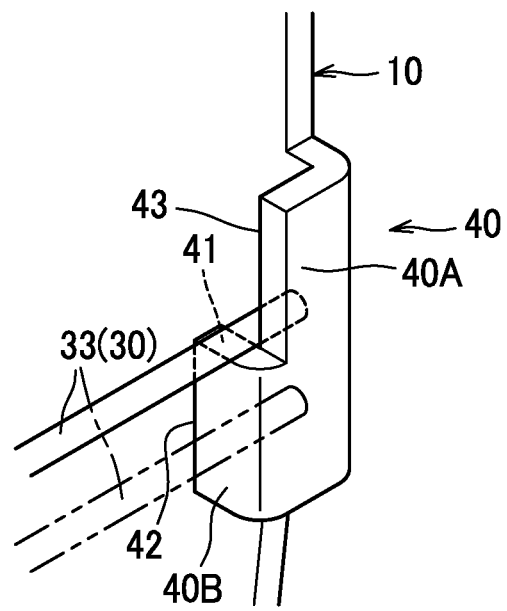
FIG. 9 is an enlarged perspective view of a retaining portion.

The retaining portion 40 is disposed on the side wall portion 12A at the front side of the bracket 10. To be more specific, part of the right end portion of the side wall portion 12A, i.e., a middle portion thereof in the upper-lower direction, is bent rearward and leftward, so that the retaining portion 40 integrated with the bracket 10 is formed. The retaining portion 40 mainly includes a first portion 40A extending rearward from the right end portion of the side wall portion 12A, and a second portion 40B extending leftward from the lower portion of the rear end of the first portion 40A. Further, as seen in FIG. 9, the retaining portion 40 has a first retaining surface 41, a second retaining surface 42, and a third retaining surface 43, which are engageable with the free end portion 33 of the lock spring 30.

The first retaining surface 41 is an upper surface of the second portion 40B; in the unlocked state, the first retaining surface 41 engages with the free end portion 33 of the lock spring 30 in a circumferential direction of the coil portion 31 (not shown), to thereby retain the lock spring 30 larger in diameter than when it is in the locked state. The first retaining surface 41 is formed as a flat surface substantially parallel to the axial direction of the lock spring 30.

The second retaining surface 42 is a left surface of the second portion 40B; in the locked state, the second retaining surface 42 contacts the free end portion 33 in the axial direction of the lock spring 30, to thereby retain the free end portion 33 deformed in the axial direction (more specifically, to the left) as compared with when the free end portion 33 engages with the first retaining surface 41. The second retaining surface 42 extends downward from the left end of the first retaining surface 41; the second retaining surface 42 is formed as a flat surface substantially perpendicular to the axial direction of the lock spring 30.

The third retaining surface 43 is a left surface of the first portion 40A provided above the first retaining surface 41; in the unlocked state, the third retaining surface 43 contacts the free end portion 33 in the axial direction of the lock spring 30. As with the second retaining surface 42, the third retaining surface 43 is formed as a flat surface substantially perpendicular to the axial direction of the lock spring 30.

Next, the operation of the one-way clutch 1 will be described. In FIGS. 10-15 to be referred to, (a) is a view that shows the position of the armrest R, (b) is a view that shows the shaft 20, the lock spring 30, and the retaining portion 40 as seen from the right side, and (c) is a view that shows the shaft 20, the lock spring 30, and the retaining portion 40 as seen from the front side. It should be noted that the acting portion 23 is hatched by dotted pattern.

As seen in FIGS. 10(a) to (c), when the armrest R is in the folded out state (at position A), the free end portion 33 of the lock spring 30 is retained by the second retaining surface 42 of the retaining portion 40, so that the free end portion 33 is kept deformed inwardly in the axial direction of the lock spring 30 as compared with the natural state of the free end portion 33 (see chain double-dashed line).

As seen in FIGS. 11(a) to (c), as the armrest R is caused to rotate upward from position A toward position B, the shaft 20 rotates anticlockwise in the figures. Then, the pressing surface 23A of the acting portion 23 provided on the shaft 20 presses the free end portion 33 of the lock spring 30 in the circumferential direction while contacting the free end portion 33. This causes the free end portion 33 of the lock spring 30 to slide on the second retaining surface 42 and to approach the first retaining surface 41, while the coil portion 31 is gradually loosened to enlarge the diameter of the coil portion 31.

As seen in FIGS. 12(a) to (c), as the armrest R is caused to rotate to position B, the fee end portion 33 is disengaged from the second retaining surface 42. The free end portion 33 then recovers from the deformed state and comes into contact with the third retaining surface 43; the free end portion 33 is disengaged from the pressing surface 23A. Then, the free end portion 33 is pressed against the first retaining surface 41 by the force of the coil portion 31 tightening the shaft 20, and engages with the first retaining surface 41 in the circumferential direction of the coil portion 31. As a result, the lock spring 30 is held in a state in which the coil portion 31 is kept enlarged in diameter than when it is in the locked state. Accordingly, as the armrest R is caused to rotate from position A to position B, the armrest R is switched from the locked state to the unlocked state.

After that, as seen in FIGS. 13(a) to (c), as the armrest R is caused to rotate from position B to position C, the acting portion 23 rotates anticlockwise in the figures in accordance with the rotation of the shaft 20; the acting portion 23 passes through the inner side of the free end portion 33 in the axial direction (i.e., lower side of the free end portion 33 in FIG. 13(c)), and moves to a position downstream of the free end portion 33 in the anticlockwise direction of the figures. In this position, since the free end portion 33 engages with the first retaining surface 41, the coil portion 31 is kept enlarged in diameter to retain the unlocked state. Also, when the armrest R is caused to rotate from position C to a position short of position A, the free end portion 33 engages with the first retaining surface 41 and the unlocked state is kept.

As seen in FIGS. 14(a) to (c), as the armrest R is caused to rotate from position C to a position short of position A, the shaft 20 rotates clockwise in the figures and the cam surface 24A of the cam portion 24 provided on the shaft 20 comes into contact with the free end portion 33. As seen in FIGS. 15(a) to (c), as the armrest R is caused to rotate from the position short of position A to position A, the free end portion 33 is pressed inward in the axial direction by the cam surface 24A, so that the free end portion 33 deforms and moves inward in the axial direction and is disengaged from the first retaining surface 41.

Once the free end portion 33 is disengaged from the first retaining surface 41, as seen in FIGS. 10(a) to (c), the free end portion 33 slides on the second retaining surface 42 and moves in a direction away from the first retaining surface 41 due to a force exerted from the coil portion 31 to tighten the shaft 20; at the same time, the coil portion 31 tightens the shaft 20. Accordingly, the armrest R is switched from the unlocked state to the locked state.

According to this embodiment as described above, the following advantageous effects can be achieved.

As seen in FIG. 6, in the armrest frame RF, the shaft 20 is fixed to the reinforcement frame 200 that is thicker than the main frame 100, so that the rigidity of a portion of the armrest frame RF near (around) the shaft 20 can be ensured by the reinforcement frame 200. On the other hand, the one-way clutch 1 is provided on the side frame S11 and not on the armrest R, and further, the thickness of the main frame 100 that constitutes the framework can be made smaller in thickness and lighter in weight by the provision of the reinforcement frame 200, so that the armrest R can be reduced in weight as a whole.

Since the mechanism, such as the one-way clutch 1, for switching between the locked state and the unlocked state is not provided on the armrest R, when the armrest frame RF is covered with an outer covering material followed by injection of foamed plastic, there is no need to provide a part (e.g., plastic cover disclosed in PTL 1) for covering and protecting the mechanism to prevent the foamed plastic from flowing into the mechanism. This makes it possible to reduce the number of parts for constituting the armrest R.

As seen in FIG. 4, since the protruding portions 21A of the shaft 20 that are engageable with the engagement holes 212 formed in the reinforcement frame 200 extend through the through-holes 112 formed in the main frame 100, the positions of the main frame 100 and the reinforcement frame 200 can be determined. Accordingly, the ease of assembly work of the armrest R can be improved.

Since the through-hole 112 and the engagement hole 212 are provided at plural positions, and the plurality of through-holes 112 and the plurality of engagement holes 212 are arranged on a circle whose center coincides with the rotation center RC, the positions of the main frame 100 and the reinforcement frame 200 can be determined easily and accurately. Accordingly, the ease of assembly work of the armrest R can be further improved.

Since the protruding portion 213 is formed on the reinforcement frame 200 and the reinforcement portion 213C is formed on an end at each side of the protruding portion 213 in the longitudinal direction, the rigidity of a portion of the armrest frame RF near the shaft 20 can be further improved.

As seen in FIG. 7, since the first joint portion C1 has the clearance C12 between the end C11 and the second side wall portion 220, and the second joint portion C2 has the clearance C22 between the end C21 and the fourth side wall portion 230, the rigidity of the armrest frame RF can be improved as compared with an alternative configuration in which each joint portion is folded back until its end contacts the corresponding side wall portion. Further, the presence of the clearance C12, C22 allows the foamed plastic to be filled in the clearance C12, C12 when the armrest frame RF is covered with the outer covering material followed by injection of the foamed plastic to form the armrest R. This can prevent the pad material formed by hardening the foamed plastic from slipping out of position.

Since the reinforcement frame 200 and the main frame 100 are joined together at the first joint portion C1 and the second joint portion C2, and the first joint portion C1 and the second joint portion C2 are provided at opposed positions in the width direction, the main frame 100 and the reinforcement frame 200 can be joined firmly. Accordingly, the rigidity of the armrest frame RF can be further improved.

Since the stopper portion 300 is disposed between the first joint portion C1 and the second joint portion C2, the stopper portion 300 can be arranged compactly. This makes it possible to reduce the size of the armrest R. Further, since the stopper portion 300 is disposed between the first joint portion C1 and the second joint portion C2 that are provided at positions opposite to each other in the width direction and join the main frame 100 and the reinforcement frame 200, it is possible to prevent the main frame 100 and the reinforcement frame 200 from being shifted from each other due to a force applied to the stopper portion 300.

Since the stopper portion 300 includes the first protruding portion 310 protruding from the second base portion 210, the stopper portion 300 can be constituted of the reinforcement frame 200 having a thickness larger than that of the main frame 100. Accordingly, even if a large force is applied to the armrest R, the rotation of the armrest R can be restricted with stability, so that a robust and stable feel which a user experiences when putting his/her arm on the armrest R can be improved. Further, since a force applied to the stopper portion 300 can be received by the first protruding portion 310, that is, by the reinforcement frame 200, the thickness of the main frame 100 can be reduced accordingly. As a result, the armrest R can be made lighter.

Since the stopper portion 300 includes the second protruding portion 320 formed on the main frame 100, and the first protruding portion 310 formed on the reinforcement frame 200 and fitted in the recess portion 321 formed in the reverse side of the second protruding portion 320, the stopper portion 300 can be formed as a double-walled structure. This can improve the rigidity of the stopper portion 300, so that the rotation of the armrest R can be restricted more stably and the robust and stable feel which a user experiences when putting his/her arm on the armrest R can be further improved.

As seen in FIG. 5, since the stopper portion 300 is disposed between the rotation center RC and the distal end portion RA, the distance from the stopper portion 300 to the distal end portion RA can be made shorter than the distance from the rotation center RA to the distal end portion RA. Accordingly, even if a force is applied to the armrest R while the stopper portion 300 restricts the rotation of the armrest R within a limited range, the armrest frame RF is less likely to deform, so that the robust and stable feel which the user experiences when putting his/her arm on the armrest R can be improved. Further, as the required rigidity is lessened, the thickness of the main frame 100 can be further made smaller. As a result, the armrest R can be further made lighter.

Since the main frame 100 has a plurality of lightening holes 114, the armrest R can be further made lighter. Portions located between adjacent lightening holes 114 form reinforcement portions 116 connected in the width direction, and the number of reinforcement portions 116 per unit length in the longitudinal direction is larger at the proximal end portion RB side where the plurality of second lightening holes 114B smaller than the first lightening hole 114A are formed than at the distal end portion RA side where the first lightening hole 114A extending long in the longitudinal direction is formed. This can improve the rigidity of the proximal end portion RB side of the armrest frame RF in which a large bending moment is applied to the armrest frame RF.

Since the lightening hole 114 is not formed in the portion of the main frame 100 at which the reinforcement frame 200 is provided, the rigidity of a portion of the armrest frame RF near the shaft 20 can be improved.

Since the lightening holes 114 are formed so as not to overlap the portion at which the first portion 110A and the second portion 110B of the first base portion 110 are bent (i.e., the first bent portion 110D) and the portion at which the second portion 110B and the third portion 110C are bent (i.e., the second bent portion 110E), the armrest frame RF can be made lighter while increasing the rigidity thereof.

As seen in FIG. 8, since the retaining portion 40 by which the lock spring 30 is kept in the enlarged state is provided on the bracket 10 that is fixed to the side frame S11, the number of parts constituting the one-way clutch 1 can be reduced as compared with an alternative configuration in which a retaining portion is provided on any member other than the bracket.

Since the retaining portion 40 is integrally formed with the bracket 10, the number of parts constituting the one-way clutch 1 can be further reduced as compared with an alternative configuration in which a retaining portion formed as a separate and distinct member is fixed to the bracket.

Since the nut 51 is disposed inside the shaft 20 as seen in FIG. 6, the one-way clutch 1 can be made smaller in size as compared with an alternative configuration in which a nut is disposed outside (around) the shaft.

Further, since the nut 51 is joined to the bent portion 21B formed by bending a portion of the end portion of the shaft 20 inwardly, it is not necessary to provide a part for joining the nut 51 to the shaft 20. This makes it possible to reduce the number of parts constituting the one-way clutch 1.

Although one embodiment of the present invention has been described above, the present invention is not limited to the above-described embodiment. Specific configurations may be modified where appropriate without departing from the gist of the present invention as will be described below.

As seen in FIGS. 16(a) to (c), the shaft 20 may have a restriction portion 25 (see portion hatched by dotted pattern in FIG. 16(b)) configured to engage with the free end portion 33 of the lock spring 30 in the circumferential direction of the coil portion 31 to restrict the rotation of the armrest frame RF (i.e., armrest R) within a limited range. The restriction portion 25 is formed to protrude from the end face 22A of the shaft 20, and has a pressing surface 23A that is a surface disposed on one side in the circumferential direction, and a restricting surface 25A that is a surface disposed on the other side in the circumferential direction. The restricting surface 25A provides a flat surface extending along the axial direction of the lock spring 30 and substantially perpendicular to the circumferential direction. The free end portion 33 of the lock spring 30 includes a bent portion 33C bent radially inward from the end portion 31A of the coil portion 31 and extending substantially linearly, and a pressed portion 33B bent and extending radially outward from the bent portion 33C. When the armrest R is in the folded out state (at position A), the restricting surface 25A of the restriction portion 25 engages with the bent portion 33C of the free end portion 33 in the circumferential direction. This makes it possible to restrict the rotation of the shaft 20 in the clockwise direction of the figures. As a result, the downward rotation of the armrest R from position A can be restricted.

With this configuration, even if a large downward force is applied to the armrest R in the folded out state, the restricting surface 25A together with the stopper portion 300 can restrict displacement of the armrest R. Further, the one-way clutch 1 can function as the stopper portion 300 and the first projection 11C; this makes it possible to eliminate the need for providing the stopper portion 300 and the first projection 11C, so that the bracket 10 and the armrest frame RF can be simplified in structure. Furthermore, since this configuration eliminates the need for providing a part for restricting the rotation of the armrest frame RF within a limited range, the number of parts can be reduced.

It should be noted that in the embodiment shown in FIG. 16, the restriction portion 25 has the pressing surface 23A that also functions as the acting portion 23 in the above-described embodiment; however, the acting portion and the restriction portion may be provided as separate and distinct portions. Further, other than the restriction portion 25, the end face 22A of the shaft 20 may be provided with a second restriction portion for restricting the rearward rotation of the armrest R from position C.

Further, in the above-described embodiment, the second retaining surface 42 of the retaining portion 40 is substantially perpendicular to the axial direction of the lock spring 30; however, as seen in FIG. 17(a), the second retaining surface 42 may incline in such a direction that the free end portion 33 deforms more with distance from the first retaining surface 41 (i.e., downward direction in the figure). As seen in FIG. 17(b), when the free end portion 33 of the lock spring 30 moves from the first retaining surface 41 to the second retaining surface 42, the free end portion 33 moves along the second retaining surface 42 in a direction away from the first retaining surface 41 by the force of the lock spring 30 tightening the shaft 20; however, since the second retaining surface 42 inclines such that the free end portion 33 deforms more with distance from the first retaining surface 41, an abrupt movement of the free end portion 33 can be prevented. Accordingly, the lock spring 30 is prevented from abruptly contacting the outer peripheral surface of the shaft 20 when the lock spring 30 in the enlarged state tightens, so that contact noise of the lock spring 30 can be reduced.

In the above-described embodiment, the fixed end portion 32 of the lock spring 30 is fixed to the bracket 10 by the fixture member 52. However, the present invention is not limited to this specific configuration. For example, as seen in FIGS. 18(a) and (b), the bracket 10 may have a recess portion 13 with which the fixed end portion 32 is engageable. To be more specific, the base portion 11 of the bracket 10 has a recess portion 13 and an annular-shaped recess portion 14 which are recessed toward the left side. The annular-shaped recess portion 14 is a recess portion with which the left end portion of the coil portion 31 is engageable; the annular-shaped recess portion 14 is formed around the flange portion 11B. The recess portion 13 is formed to extend radially outward of the hole 11A from the annular-shaped recess portion 14. The depth of the recess portion 13 is deeper than the radius of the fixed end portion 32. With this configuration, the fixed end portion 32 can be fixed stationarily to the bracket 10 by engaging the end portion of the coil portion 31 with the annular-shaped recess portion 14 and by engaging the fixed end portion 32 with the recess portion 13. This can eliminate the need for providing a part for holding the fixed end portion 32, such as the fixture member 52 in the above-described embodiment, so that the number of parts can be reduced.

In the above-described embodiment, the stopper portion 300 is formed as a double-walled structure. However, the present invention is not limited to this specific configuration. For example, as described below with reference to FIG. 7, the first base portion 110 may have a hole, through which the first protruding portion 310 extends, in place of the second protruding portion 320; the first protruding portion 310 extends through the hole and protrudes rightward farther than the first base portion 110 to form the stopper portion. Further, in the above-described embodiment, the stopper portion 300 is integrally formed with the armrest frame RF; however, a stopper portion formed as a separate and distinct member other than the armrest frame RF may be attached to the armrest frame RF.

In the above-described embodiment, the retaining portion 40 is integrally formed with the bracket 10; however, a retaining portion formed as a separate and distinct member other than the bracket 10 may be attached to the bracket 10.

In the above-described embodiment, the bracket 10 is exemplified as the stationary frame on which the retaining portion 40 is provided; however, the stationary frame may be the side frame S11 for instance. As an example, a portion of the side frame S11 may be cut and raised to provide a shape similar to the bracket 10 shown in the above-described embodiment.

In the above-described embodiment, the shaft 20 and the reinforcement frame 200 are fixed together by fastening the nut 51 and the bolt 90; however, the shaft and the reinforcement frame may be fixed together, for example, by welding.

In the above-described embodiment, the car seat S installed in an automobile is exemplified as a seat to which the armrest R and the one-way clutch 1 are attached; however, the seat may be a vehicle seat installed in a vehicle other than automobile, such as a railway car, a marine vessel, and an aircraft. Further, the seat is not limited to a vehicle seat; for example, the seat may be a household seat.

In the above-described embodiment, the side frame S11 of the seat back S1 is exemplified as a side frame constituting a right frame or a left frame of the seat frame SF; however, the side frame may be a side frame of the seat cushion for instance. Further, in the above-described embodiment, the armrest frame RF is exemplified as a rotatable frame; however, the rotatable frame may be a frame or the like of an Ottoman footstool that is rotatable relative to the frame of the seat cushion for instance.

Each of the elements explained in the above-described embodiments and modified embodiments may be combined as desired.

The invention claimed is:

1. An armrest fixed to a shaft of a one-way clutch that is provided on a seat frame, the armrest being rotatable together with the shaft relative to the seat frame and switchable by the one-way clutch between a locked state in which rotation of the armrest in one direction is restricted and an unlocked state in which rotation of the armrest in two directions is allowed, the armrest comprising:
 a main frame constituting a framework of the armrest; and
 a reinforcement frame having a thickness larger than that of the main frame, the reinforcement frame and the main frame lying one over another,
 wherein the reinforcement frame is fixed to the shaft,
 wherein the main frame comprises:
  a first base portion;
  a first side wall portion provided at one end of the first base portion in a width direction orthogonal to a longitudinal direction of the first base portion and extending from the one end of the first base portion in a direction away from the seat frame; and
  a first folded-back portion extending from an end of the first side wall portion and folded back such that an end of the first folded-back portion points to the first base portion,
 wherein the reinforcement frame comprises:
  a second base portion overlying the first base portion and fixed to the shaft,
  a second side wall portion provided at one end of the second base portion in the width direction and extending from the one end of the second base portion in a direction away from the seat frame such that the second side wall portion and the first side wall portion lie one over another, and
  a second folded-back portion extending from an end of the second side wall portion and folded back such that an end of the second folded-back portion points to the second base portion, the second folded-back portion and the first folded-back portion lying one over another,
 wherein the reinforcement frame and the main frame are joined together at a first joint portion at which the first folded-back portion and the second folded-back portion lie one over another, and
 wherein the first joint portion has a clearance formed between an end of the first joint portion and one of the first side wall portion and the second side wall portion, which is closer to the end of the first joint portion than the first side wall portion.

2. The armrest according to claim 1,
 wherein the reinforcement frame has an engagement hole with which a protruding portion provided on an end portion of the shaft is engaged, and
 wherein the main frame has a through-hole through which the protruding portion extends.

3. The armrest according to claim 2, wherein the through-hole and the engagement hole are provided at plural positions corresponding to a plurality of protruding portions provided on the end portion of the shaft, and are arranged on a circle whose center coincides with a rotation center of the armrest.

4. The armrest according to claim 1, wherein the main frame comprises:
 a third side wall portion provided at another end of the first base portion in the width direction and extending from the another end of the first base portion in a direction away from the seat frame, and
 a third folded-back portion extending from an end of the third side wall portion and folded back such that an end of the third folded-back portion points to the first base portion,
 wherein the reinforcement frame comprises:
  a fourth side wall portion provided at another end of the second base portion in the width direction and extending from the another end of the second base portion in a direction away from the seat frame such that the fourth side wall portion and the third side wall portion lie one over another, and
  a fourth folded-back portion extending from an end of the fourth side wall portion and folded back such that an end of the fourth folded-back portion points to the second base portion, the fourth folded-back portion and the third folded-back portion lying one over another,
wherein the reinforcement frame and the main frame are joined together at the first joint portion and at a second joint portion at which the third folded-back portion and the fourth folded-back portion lie one over another, and
wherein the first joint portion and the second joint portion are provided at positions opposite to each other in the width direction.

5. The armrest according to claim 4, wherein the second joint portion protrudes to an inner side of the third side wall portion.

6. The armrest according to claim 4, further comprising a stopper portion configured to contact a portion of the seat frame to restrict rotation of the armrest within a limited range,
wherein as viewed from a direction of an axis of rotation of the armrest, the stopper portion is disposed between the first joint portion and the second joint portion.

7. The armrest according to claim 4,
wherein the main frame comprises a side wall portion provided continuously around an entire circumferential edge of the first base portion, the side wall portion extending in a direction away from the seat frame, and
wherein the first side wall portion and the second side wall portion are formed as integral portions of the side wall portion.

8. The armrest according to claim 4, wherein a rotation center of the armrest is disposed between the third folded-back portion and the fourth folded-back portion of the reinforcement frame.

9. The armrest according to claim 1, wherein the first joint portion protrudes to an inner side of the first side wall portion.

10. A vehicle seat comprising:
a seat frame;
an armrest according to claim 1; and
a one-way clutch provided on the seat frame and including a shaft to which the armrest is fixed, such that the armrest is rotatable together with the shaft relative to the seat frame and switchable by the one-way clutch between the locked state and the unlocked state,
wherein the reinforcement frame is located farther than the main frame away from the seat frame.

11. An armrest fixed to a shaft of a one-way clutch that is provided on a seat frame, the armrest being rotatable together with the shaft relative to the seat frame and switchable by the one-way clutch between a locked state in which rotation of the armrest in one direction is restricted and an unlocked state in which rotation of the armrest in two directions is allowed, the armrest comprising:
a main frame constituting a framework of the armrest;
a reinforcement frame having a thickness larger than that of the main frame, the reinforcement frame and the main frame lying one over another, the reinforcement frame being fixed to the shaft; and
a stopper portion configured to contact a portion of the seat frame to restrict rotation of the armrest within a limited range,
wherein the main frame comprises a hole,
wherein the reinforcement frame comprises a protrusion, and
wherein the stopper portion comprises the protrusion of the reinforcement frame fitted in the hole of the main frame.

12. The armrest according to claim 11,
wherein the main frame comprises a proximal end portion located closer to a rotation center of the armrest relative to a distal end portion located farther from the rotation center, and
wherein the stopper portion is disposed between the rotation center and the distal end portion in a longitudinal direction of the main frame.

13. The armrest according to claim 11, wherein the hole of the main frame has a bottom.

14. The armrest according to claim 11,
wherein the reinforcement frame has an engagement hole with which a protruding portion provided on an end portion of the shaft is engaged, and
wherein the main frame has a through-hole through which the protruding portion extends.

15. The armrest according to claim 14, wherein the through-hole and the engagement hole are provided at plural positions corresponding to a plurality of protruding portions provided on the end portion of the shaft, the plural positions being arranged in a circle having a center that coincides with a rotation center of the armrest.

16. An armrest fixed to a shaft of a one-way clutch that is provided on a seat frame, the armrest being rotatable together with the shaft relative to the seat frame and switchable by the one-way clutch between a locked state in which rotation of the armrest in one direction is restricted and an unlocked state in which rotation of the armrest in two directions is allowed, the armrest comprising:
a main frame constituting a framework of the armrest; and
a reinforcement frame having a thickness larger than a thickness of the main frame, the reinforcement frame and the main frame lying one over another,
wherein the reinforcement frame is fixed to the shaft,
wherein the main frame comprises:
a proximal end portion,
a distal end portion located farther from the rotation center relative to the proximal end portion, and
a plurality of lightening holes disposed in line along a longitudinal direction of the main frame, and
wherein the plurality of lightening holes comprises:
a first lightening hole located near the distal end portion,
a second lightening hole different in size from the first lightening hole, and
a third lightening hole located closer, than the second lightening hole, to the rotation center.

17. The armrest according to claim 16, wherein the reinforcement frame is disposed closer to the proximal end portion than the plurality of lightening holes.

18. The armrest according to claim 16,
wherein the reinforcement frame has an engagement hole with which a protruding portion provided on an end portion of the shaft is engaged, and
wherein the main frame has a through-hole through which the protruding portion extends.

19. The armrest according to claim 18, wherein the through-hole and the engagement hole are provided at plural positions corresponding to a plurality of protruding portions provided on the end portion of the shaft, the plural positions being arranged in a circle having a center that coincides with a rotation center of the armrest.

* * * * *